United States Patent
Phadke et al.

(10) Patent No.: US 10,095,848 B2
(45) Date of Patent: *Oct. 9, 2018

(54) SYSTEM, METHOD AND APPARATUS FOR SECURELY DISTRIBUTING CONTENT

(71) Applicant: paSafeShare LLC, Colts Neck, NJ (US)

(72) Inventors: Madhav S Phadke, Colts Neck, NJ (US); Kedar M Phadke, Colts Neck, NJ (US)

(73) Assignee: PASAFESHARE LLC, Colts Neck, NJ (US)

(*) Notice: Subject to any disclaimer, the term of this patent is extended or adjusted under 35 U.S.C. 154(b) by 106 days.

This patent is subject to a terminal disclaimer.

(21) Appl. No.: 15/276,265

(22) Filed: Sep. 26, 2016

(65) Prior Publication Data

US 2017/0024551 A1 Jan. 26, 2017

Related U.S. Application Data

(63) Continuation-in-part of application No. 14/029,021, filed on Sep. 17, 2013, now Pat. No. 9,455,961, which is a continuation-in-part of application No. 13/162,209, filed on Jun. 16, 2011, now Pat. No. 9,615,116.

(60) Provisional application No. 61/702,292, filed on Sep. 18, 2012.

(51) Int. Cl.
| | |
|---|---|
| G06F 21/16 | (2013.01) |
| H04L 29/06 | (2006.01) |
| H04N 21/254 | (2011.01) |
| H04N 21/4627 | (2011.01) |

(52) U.S. Cl.
CPC .......... *G06F 21/16* (2013.01); *H04L 63/0428* (2013.01); *H04N 21/2541* (2013.01); *H04N 21/4627* (2013.01); *H04L 2463/041* (2013.01)

(58) Field of Classification Search
CPC .................................................. G06F 21/16
See application file for complete search history.

(56) References Cited

U.S. PATENT DOCUMENTS

| | | | |
|---|---|---|---|
| 6,185,684 B1 | 2/2001 | Pravetz et al. | |
| 6,389,538 B1 | 5/2002 | Gruse et al. | |
| 7,016,498 B2 * | 3/2006 | Peinado | H04L 9/00 |
| | | | 380/277 |
| 7,174,373 B1 | 2/2007 | Lausier | |
| 7,203,966 B2 | 4/2007 | Abburi et al. | |
| 7,272,723 B1 | 9/2007 | Abbott et al. | |

(Continued)

OTHER PUBLICATIONS

DCI, "DCI Specification Errata Listing", 2006.

(Continued)

*Primary Examiner* — Kambiz Zand
*Assistant Examiner* — Thanh H Le
(74) *Attorney, Agent, or Firm* — Meagner Emanuel Laks Goldberg & Liao, LLP

(57) ABSTRACT

System, method and apparatus for securely distributing content via an encrypted file wherein a Publisher Key (PK) associated with an authorized publisher enables presentation of the content by the authorized user via a Limited Capability Viewer (LCV), the LCV lacking the capability to forward, print, copy or otherwise disseminate the content to be presented unless available advanced permissions are granted to the authorized user.

19 Claims, 11 Drawing Sheets

(56) References Cited

U.S. PATENT DOCUMENTS

| | | |
|---|---|---|
| 7,296,296 B2 | 11/2007 | Dunbar et al. |
| 7,383,205 B1 | 6/2008 | Peinado et al. |
| 7,571,467 B1 | 8/2009 | Priestley et al. |
| 7,660,902 B2 | 2/2010 | Graham et al. |
| 8,495,751 B2 | 7/2013 | Joyce et al. |
| 8,627,485 B1 | 1/2014 | Phelan |
| 2001/0051996 A1 | 12/2001 | Cooper et al. |
| 2002/0048369 A1 | 4/2002 | Ginter et al. |
| 2002/0059144 A1 | 5/2002 | Meffert et al. |
| 2002/0101998 A1 | 8/2002 | Wong et al. |
| 2002/0184517 A1 | 12/2002 | Tadayon et al. |
| 2002/0198846 A1 | 12/2002 | Lao |
| 2003/0009423 A1 | 1/2003 | Wang et al. |
| 2003/0023564 A1 | 1/2003 | Padhye et al. |
| 2003/0079030 A1 | 4/2003 | Cocotis et al. |
| 2003/0135466 A1 | 7/2003 | Wang et al. |
| 2003/0200177 A1 | 10/2003 | Kugai |
| 2003/0202679 A1 | 10/2003 | Rodriguez |
| 2004/0193546 A1 | 9/2004 | Tokutani et al. |
| 2005/0086501 A1 | 4/2005 | Woo et al. |
| 2005/0097359 A1 | 5/2005 | Speare et al. |
| 2005/0134894 A1* | 6/2005 | Littman .............. G06F 3/12 358/1.14 |
| 2005/0177742 A1 | 8/2005 | Benson et al. |
| 2005/0198165 A1 | 9/2005 | Reddel et al. |
| 2005/0204405 A1 | 9/2005 | Wormington et al. |
| 2006/0048224 A1* | 3/2006 | Duncan .............. G06F 12/14 726/22 |
| 2006/0080259 A1 | 4/2006 | Wajs |
| 2006/0259949 A1 | 11/2006 | Schaefer et al. |
| 2007/0240203 A1 | 10/2007 | Beck |
| 2008/0092181 A1 | 4/2008 | Britt |
| 2008/0240447 A1* | 10/2008 | Zhu .............. H04L 9/32 380/279 |
| 2008/0256368 A1 | 10/2008 | Ross et al. |
| 2008/0294899 A1* | 11/2008 | Gazzetta .............. H04L 9/14 713/170 |
| 2009/0124375 A1 | 5/2009 | Patel |
| 2009/0196426 A1 | 8/2009 | Walker et al. |
| 2010/0008500 A1 | 1/2010 | Lisanke et al. |
| 2010/0017599 A1 | 1/2010 | Sellars et al. |
| 2010/0161997 A1 | 6/2010 | Lee et al. |
| 2012/0102317 A1 | 4/2012 | Mathur et al. |
| 2012/0102329 A1 | 4/2012 | Mittal et al. |
| 2012/0121236 A1 | 5/2012 | Jeong et al. |
| 2012/0317239 A1 | 12/2012 | Mulder et al. |
| 2012/0321083 A1 | 12/2012 | Phadke et al. |

OTHER PUBLICATIONS

DCI, "Digital Cinema System Specification" "Version 1.2", 2012.
Wang et al., "A Digital Cinema Playback System Compliant with the DCI Specification", 2009.
Simeonidou et al., "Optical Network Services for Ultra High Definition Digital Media Distribution", 2008.
Merriam-Webster, "processor", 2014.

* cited by examiner

SYSTEM, METHOD AND APPARATUS FOR SECURELY DISTRIBUTING CONTENT

CROSS-REFERENCE TO RELATED APPLICATIONS

This application is a continuation-in-part of pending U.S. patent application Ser. No. 14/029,021, filed on Sep. 17, 2013, and Ser. No. 13/162,209, filed on Jun. 16, 2011, both of which are entitled SYSTEM, METHOD AND APPARATUS FOR SECURELY DISTRIBUTING CONTENT, and claims the benefit of Provisional Patent Application Ser. No. 61/702,292, filed on Sep. 18, 2012, entitled SYSTEM, METHOD AND APPARATUS FOR SECURELY DISTRIBUTING CONTENT; all of these applications being incorporated herein by reference in their entireties.

FIELD OF THE INVENTION

The invention relates generally to the distribution of content and, more specifically but not exclusively, protecting such content from redistribution or re-presentation.

BACKGROUND

The various techniques exist for secure content distribution. Such techniques include password protection of content (e.g., password protection of a document or media file), access restrictions associated with content (e.g., username and password requirements associated with a web portal) and so on. Some of the techniques require proprietary software or middleware executed at a client device. Other techniques require real-time user authentication via an authentication server or other device connected to a client via a network such as the Internet.

SUMMARY

Various deficiencies in the prior art are addressed by systems, methods and apparatus providing secure content publication and presentation capabilities. One embodiment of a method for securely distributing content, comprises generating an encrypted file including content or a link thereto, and a Publisher Key (PK) associated with presentation of said content by an authorized user via a Limited Capability Viewer (LCV); and propagating the generated encrypted file towards a user. The LCV may comprise 1) a program specifically designated to consume content while restrict editing, printing, copying, etc. of content; or 2) a native program for consuming content which is used in a restrictive mode to restrict editing, printing, copying, etc. of content. Only users who have a Content Consumer License (CCL) compatible with the encrypted PK may access and consume the content. The CCL may be distributed via hardware or software. Various embodiments provided enhanced user authentication or authorization, VPN functions, collaboration techniques, automatic distribution of licenses, watermarking of documents, rules pertaining to content transfer between secure and insecure domains and combinations thereof.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
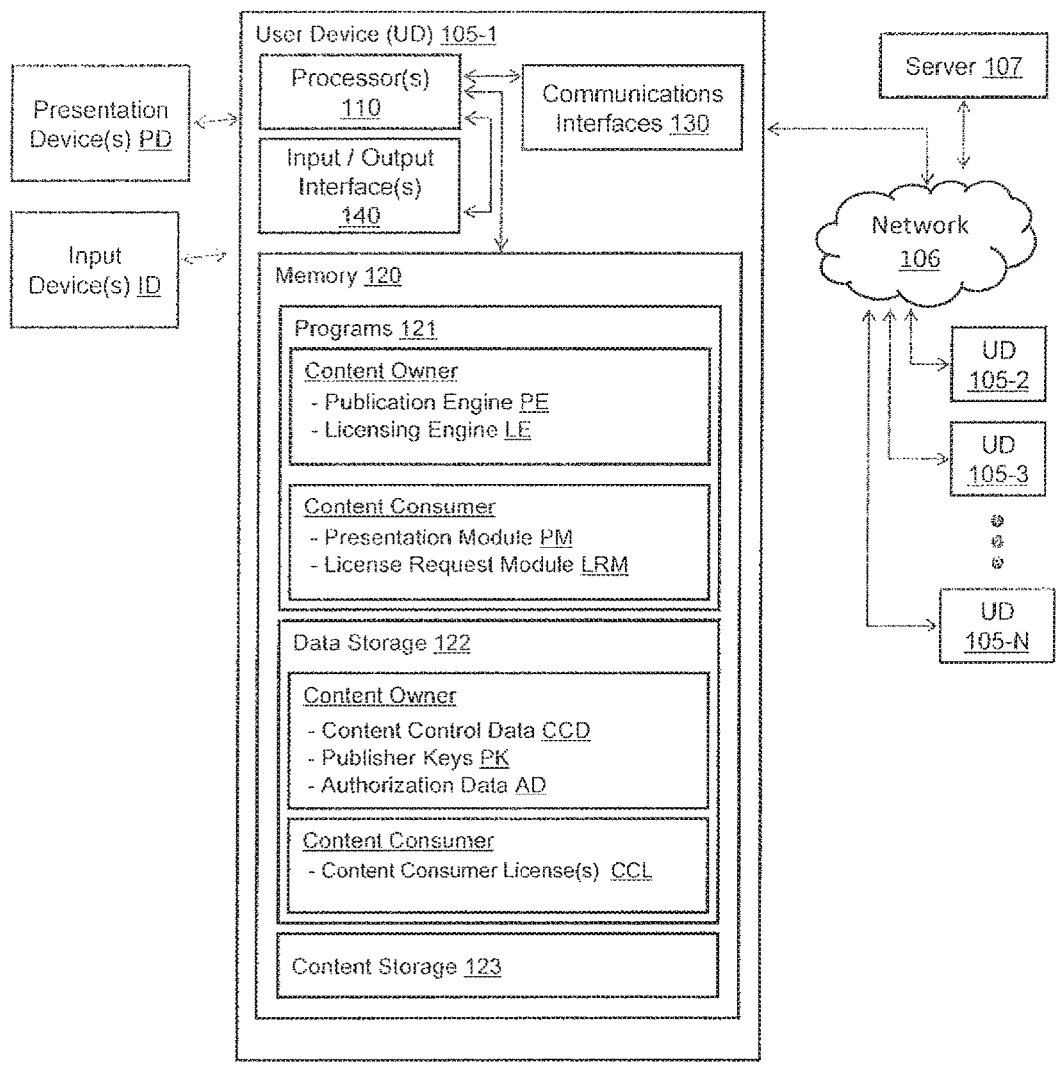
FIG. 1 depicts a high-level block diagram of a system according to one embodiment.

A secure content distribution capability is depicted and described herein. The secure content distribution capability enables efficient and secure distribution of content to specific users for a limited purpose, such as presentation of a securely distributed document upon a presentation device. The securely distributed documents may not be printed by specific users or forwarded to other users for presentation, printing or other purposes.

Although the secure content distribution capability is primarily depicted and described herein within the context of a specific document format, it will be appreciated that the secure content distribution capability may be used for distributing documents according to various other formats. Broadly speaking, the secure content distribution capability may be used to securely distribute any type of content including documents or files according to various formats, as well as streaming media such as audio and/or video and other active content.

The various embodiments include methodologies implemented in software and/or hardware for securely distributing content such as documents between content owners or other content source entities and content consumers. These security methodologies provide user specific authentication, machine specific authentication and the like to ensure that only a specific user, or a specific user machine, or a specific user on a specific user machine is authenticated to access the secure content. Moreover, the security methodologies prevent users from printing, copying, modifying or saving the protected documents, and are capable of providing security within and across corporate networks and other domains. For example, where protected documents or files are sent to other users via email or other transfer means, the documents or files are unreadable by recipient without permission of content owner.

The various embodiments contemplate that securely distributed content, documents or other files is presented using Limited Capability Viewer LCV for viewing in a native content, document or other file format. For example, a Microsoft PowerPoint file protected according to various embodiments may be viewed using the end user's Microsoft PowerPoint or Microsoft PowerPoint Viewer program. Thus, all animations, multimedia, and other dynamic content are preserved and the end user will get a true presentation experience. However, all content is fully encrypted and protected while opened by the user and also during transmission from the content owner to the user. Similarly, Microsoft Word, Excel, Visio, and other files which are protected by the software will be viewed using corresponding native programs while protected.

A protected document package can have one or multiple files. These files can be grouped into tiers of security level so that end users can access only the files they are specifically authorized to access. A protected document package may comprise a database including varying one or more content files, wherein the one or more content files are extracted from the database prior to secure presentation via the Limited Capability Viewer LCV program.

It is noted that the content owner does not need to know all the end users before creating the protected document packages. In this manner, the various embodiments eliminate a need for a common, central user management service while allowing for easy within domain, cross-domain, and cross-company sharing of protected documents.

It is noted that there is no requirement for online verification of a user prior to secure presentation of a protected document package. Keys and other data structures adapted for enabling secure presentation of the protected document package may be distributed prior to secure content presentation or after an attempt to securely present the content. Moreover, multiple keys of different types are employed within the context of the various embodiments to enable a flexible mechanism for securely presenting content.

FIG. 1 depicts a high-level block diagram of a system according to one embodiment. Specifically, the system 100 of FIG. 1 contemplates a plurality of user devices 105 communicating with each other via the network 106. In various embodiments, the user devices 105 optionally communicate with a server 107 via the network 106.

The plurality of user devices 105 are denoted as user devices 105-1, 105-2, 105-3 and so on up to 105-N. In the embodiments discussed herein, each of the user devices 105 is configured in substantially the same manner in terms of hardware, software, resources and the like. However, it will be appreciated by those skilled in the art that the various user devices 105 may comprise different classes of user devices such as computers, mobile devices, smart phones, set-top terminals, heavy clients, light clients and so on. Generally speaking, a user device 105 is simply a device capable of operating in accordance with one or more aspects of the present invention, and many different user device configurations may be used at the same time.

As depicted in FIG. 1, each user device 105 includes a processor 110, a memory 120, communications interfaces 130 and an input-output (I/O) interface 140. The processor 110 is coupled to each of memory 120, communication interfaces 130, and I/O interface 140.

The processor 110 is configured for controlling the operation of user device 105, including operations supporting the secure content publication and presentation capabilities described herein with respect to the various embodiments.

The memory 120 is configured for storing information suitable for use in providing the advertising presentation and transaction capability. Memory 120 may store programs 121, data 122, content 123 and the like. Within the context of the various embodiments, the programs 121 and data 122 may vary depending upon whether the user device 105 is operating as a content owner, or a content consumer or both.

When a user device 105 operates in a content owner or content source mode of operation, the programs 121 may comprise a publication engine PE, a licensing engine LE and/or other programs adapted for implementing the secure content sourcing/publication methodologies described herein. Similarly, in the content owner or content source mode of operation, the data storage 122 may comprise content control data CCD, publisher keys PK, authorization data AD and/or other data adapted for implementing the secure content sourcing/publication methodologies described herein. The content storage 123 may include content, uniform resource locators (URLs) or other data structures pointing to content, to be securely published and transmitted toward one or more user devices 105 operating in a content consumer mode.

When a user device 105 operates in a content consumer or content destination mode of operation, the programs 121 may comprise a presentation module PM, a license request module LRM and/or other programs adapted for implementing the secure content consumption/presentation methodologies described herein. Similarly, in a content consumer mode of operation, the data storage 122 may comprise one or more Content Consumer Licenses CCL and/or other data adapted for implementing the secure content consumption/presentation methodologies described herein.

Generally speaking, the memory 120 may store any information suitable for use by the user device 105 in implementing one or more of the secure content sourcing/publication methodologies described herein, the secure content consumption/presentation methodologies described herein or other functions.

The communications interfaces 130 may include a location signaling interface such as a global positioning GPS and or cellular telephone tower triangulation system to determine the location of the user device 105.

The communications interfaces 130 include one or more services signaling interface such as a Wi-Fi or WiMAX interface, a 3G wireless interface, a 4G wireless interface, an Ethernet interface and the like for supporting data/services signaling between user device 105 and the network 106. It will be appreciated that fewer or more, as well as different, communications interfaces may be supported. The various communications interfaces 130 are adapted to facilitate the transfer of files, data structures, messages, request and the like between various entities in accordance with the embodiments discussed herein.

It will be appreciated that the various embodiments do not require a continual online presence. Once content consumer has received CCL from content owner (whether via hardware or software), the content consumer can be completely disconnected from all networks and communication interfaces depending on the embodiment and configuration of user device 105. For example, a recipient presenting content in a protected manner does not need to be communicating with another entity at the time such content is processed and/or presented by a user device. The I/O interface 140 may be coupled to presentation devices PD interface(s) such as associated with display devices for presenting information to a user, input devices ID such as touch screen or keypad input devices for enabling user input, and/or interfaces enabling communication between the user device 105 and other computing or input/output devices (not shown).

Presentation devices PD may include a display screen, a projector, one or more speakers, and the like, which may be used for displaying data, displaying video, playing audio, and the like, as well as various combinations thereof. The typical presentation interfaces of user devices, including the design and operation of such interfaces, will be understood by one skilled in the art.

Input devices ID may include any user control devices suitable for use in enabling the user of the user device 105 to interact with the user device 105. For example, the input devices IDs may include touch screen based user controls, stylus-based user controls, a keyboard and/or mouse, voice-based user controls, and the like, as well as various combinations thereof. The typical user control interfaces of user devices, including the design and operation of such interfaces, will be understood by one skilled in the art.

Although primarily depicted and described as having specific types and arrangements of components, it will be appreciated that any other suitable types and/or arrangements of components may be used for user device 105.

It will be appreciated that the functions depicted and described herein may be implemented in software and/or hardware, e.g., using a general purpose computer, one or more application specific integrated circuits (ASIC), and/or any other hardware equivalents. In one embodiment, the various programs depicted as loaded within memory 120 are executed by the processor 110 to implement their respective functions. It will also be appreciated that the various programs may be stored on a computer readable storage medium prior to being loaded into memory 120; such computer readable storage media comprising semiconductor memory devices, magnetic media, optical media, electro-magnetic media and the like. Generally speaking, any form of tangible computer memory may be used to store computer instructions which, when executed by the processor 110, operate to perform the various methods and functions described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a broadcast or other tangible signal-bearing medium, and/or stored within a memory within a computing device operating according to the instructions.

In various embodiments, the server 107 may operate as a content owner or content source as described above with respect to the user device 105. That is, the server 107 may include the various functionality described above with respect to user device 105 such that the server 107 may implement the secure content sourcing/publication methodologies as described herein.

In various embodiments, the server 107 cooperates with one or more user devices 105 to implement the secure content sourcing/publication methodologies described herein. For example, the server 107 may be used to perform the function of a publication engine PE, licensing engine LE and/or other content owner functions on behalf of a source user device 105. The securely published content may then be transmitted to recipient user devices via the source user device 105 or via the server 107.

In various embodiments, the server 107 cooperates with one or more user devices 105 to implement the secure content consumption/presentation methodologies described herein. For example, the server 107 may be used to assist in the performance of the functions of a presentation module PM, a license request module LRM and/or other content consumer functions on behalf of a destination user device 105.

It is noted that the presentation module PM associated with a destination user device operates in a manner preventing further conveyance of securely published content to other entities, storage of the securely published content to the destination user device, printing of the securely published content and so on.

As an example, the PDP may define a specific Microsoft PowerPoint file that is authorized for presentation by a particular user (e.g., user machine initially executing the received file including the PDP), using a particular type of presentation program (e.g., the limited function Microsoft PowerPoint viewer), and only within a particular time period (e.g., within the next 48 hours). It is noted that upon receiving the PDP, the specific computer executing the PDP container file is examined to determine, illustratively, a processor identification number or other identifier associated with the computer to establish thereby the one computing device authorized to present the securely published content.

The CCL may be delivered via email, web, optical media, magnetic media, semiconductor media or any other electronic transmission, software or hardware delivery method. For example, the CCL may be delivered via a hardware means such as a USB memory device, an SD memory device or other semiconductor memory device; a CD ROM, DVD or other optical memory device; or a hard disk drive, mass storage device or other media including thereon software instructions representing the CCL.

A hardware device provided the CCL may be constrained to a particular type of device (i.e., an approved device), such as a specific type or capacity of memory device. In various embodiments, the hardware device is merely used to deliver the CCL. In other embodiments, the hardware device including the CCL is necessary for presentation by the LCV. That is, the CCL operates as a hardware key to provide secure access or presentation of content.

For example, in one embodiment an entity such as an employer (content source) provides its employees (content consumers) with a specific type of hardware key that must be used to present the content. The employee must have the hardware key inserted in the computer to present the content.

Thus, in various embodiments, a Content Consumer License (CCL) is generated for each authorized user and distributed for each authorized user via a computer readable medium. The CCL provided in this manner is effective to enable secure content viewing by the authorized user only when the computer readable medium including the CCL is operatively connected to a computing device associated with the authorized user.

Figure 2:
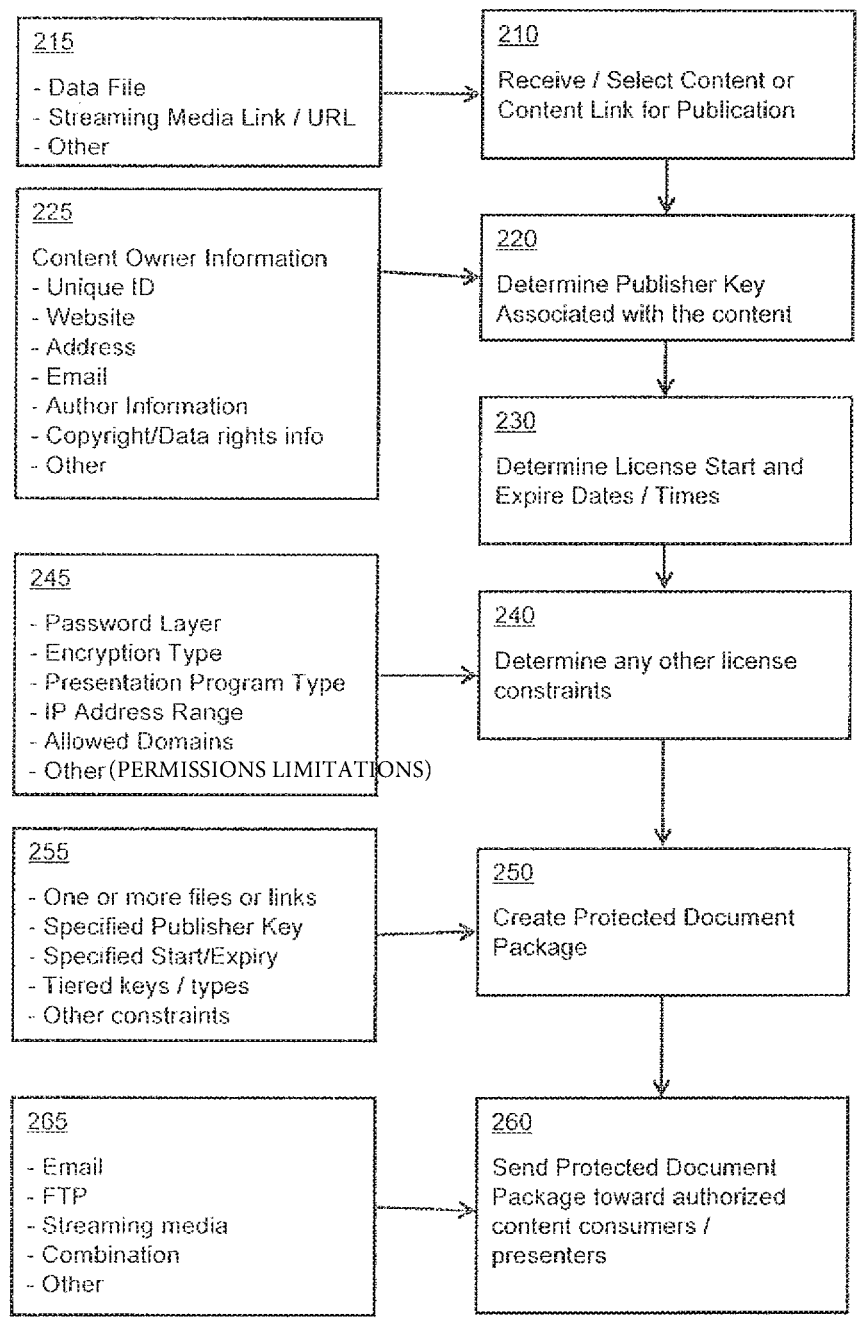
FIG. 2 depicts a flow diagram of a secure content publication method according to one embodiment.

FIG. 2 depicts a flow diagram of a secure content publication method according to one embodiment. Specifically, the method 200 of FIG. 2 is adapted to publishing content in a secure manner and distribute that content toward content consumers for secure presentation. The method 200 may be invoked within the context of a publication engine PE of a user device 105 or server 107 implementing the secure content sourcing/publication methodologies of the various embodiments.

At step 210, content to be published or a URL identifying content to be sourced or published is received or selected by, illustratively, a user device 105 or server 107 operating in a content owner or content source mode of operation. Referring to box 215, the content to be published may comprise a data file, the media file, a streaming media link/URL or other data file type or link thereto. At step 220, the Publisher Key PK or Publisher Keys associated with the content are determined by content owner. Referring to box 225, this determination may be made with respect to Content Owner Information such as Unique ID, Website, Physical Address, Email Address, Author Information, Copyright/Data or other rights information, and/or other types of information.

At step 230, licensing start and/or licensing expiration date and time information is optionally determined. That is, a date-bounded window within which the securely published content may be presented is defined. If further position is desired, a time-bounded window is also determined. The securely published content may be presented during the allowed window. Attempt to present the securely published content outside of the defined presentation window will not be allowed. Optionally, attempts to present the content outside of the defined window will result in the content being deleted or destroyed.

At step 240, a determination is made as to any other constraints associated with the license to present the securely published content. Referring to box 245, other licensing constraints may be defined in terms of a password protection layer, a type of encryption used to secure the content, a type of presentation program used to present the content, an IP address range associated with devices allowed to present the content, one or more domain names associated with devices allowed to present the content and other constraints. Optionally, attempts to present the content outside of the defined other licensing constraints will result in the content being deleted or destroyed.

In various embodiments, step 240 (and/or box 245) is modified to defined licensing constraints for limiting the use of advanced permissions in accordance with optional advanced permissions embodiments such as described more detail below. Such advanced permissions may comprise, illustratively, selectively allowing an authorized user to modify, save and/or print protected content, defining a number of times an authorized user may modify, save and/or print protected content, defining a duration or viewing time for viewing protected content and/or other advanced permissions described herein.

In particular, permissions limitations may be included as license constraints 1 forming a PDP such that only a subset of advanced permissions are made available to an authorized user, irrespective of the particular advanced permissions granted to that user (e.g., via CCL). For example, content from a particular content provider may protected content with a PDP where the use of the protected content is limited to advanced permissions pertaining to viewing protected content for a predetermined number of views or for a predetermined duration. This limitation is enforced by a limited capability viewer or other client-side presentation/use device irrespective of whether or not the authorized user has been granted other advanced permissions (e.g., an advanced permission to print protected content is not honored if printing is not defined as an available advanced permission). Stated differently, in various embodiments advanced permissions granted to an authorized user are limited by the LCV (or other mechanism) to available advanced permissions associated with protected content as, illustratively, license constraints.

At step 250, a Protected Document Package (PDP) associated with the protected content is created. Referring to box 255, the PDP comprises a file or other data structure including one or more files (or links thereto) associated with the content to be protected and the specified publisher keys associated with authorized content users/presenters. Optionally, the PDP may also include one or more of the following: the specified start and expiry dates and/or times associated with a defined presentation window, tiered publication keys and/or other types of tiered constraints, and other defined licensing constraints.

At step 260 the PDP is transmitted towards authorized content consumers or presenters. Referring to box 265, the PDP may be transmitted via e-mail, file transfer protocol (FTP), streaming media, other types of data transfer means and/or a combination of any of the above. In particular, a file or other data structure representing the PDP may be transmitted towards authorized content users. Alternatively, a link to a file or other data structure representing the PDP may be transmitted towards authorized content users.

In various embodiments, the methodology 200 of FIG. 2 is adapted to provide a Protected Document Package PDP for conveyance to an authorized user. The protected document package may be included within a container file or other data structure suitable for processing at a receiving computer. The PDP or its container file may be self-executing. Alternatively, the PDP or its container file may be processed in conjunction with a client file resident at (or retrievable by) the receiving computer.

Figure 3:
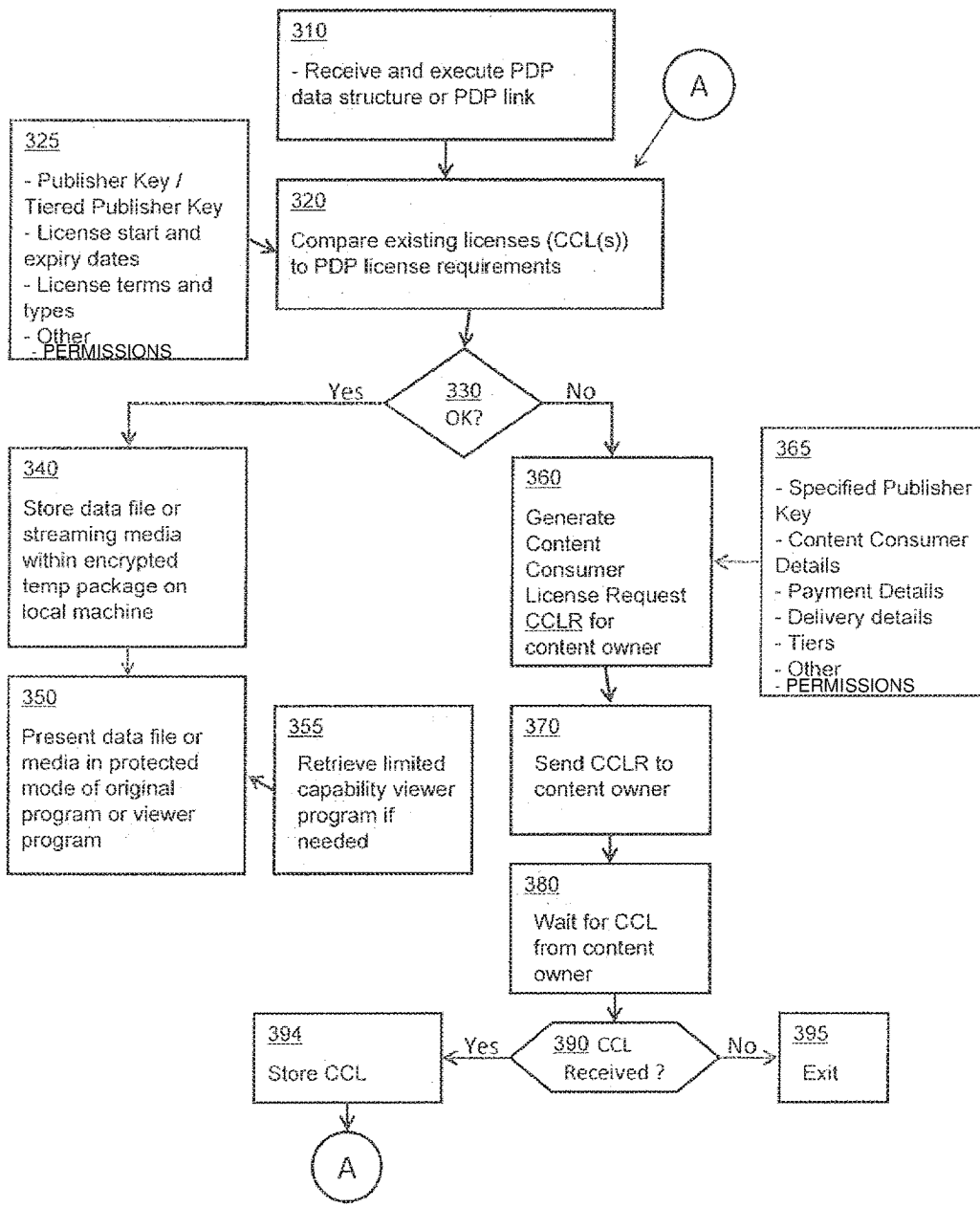
FIG. 3 depicts a flow diagram of a secure content presentation method according to one embodiment.

FIG. 3 depicts a flow diagram of a secure content presentation method according to one embodiment. Specifically, the method 300 of FIG. 3 is adapted to process a received PDP or PDP container to securely present the associated content. The method 300 may be invoked within the context of a presentation module PM and/or license request module LRM of a user device 105 implementing the secure content consumption/presentation methodologies of the various embodiments.

The method 300 may be invoked by a self-executing program associated with a received PDP or PDP container. The method 300 may also be invoked by a previously instantiated client program at a user device.

At step 310, a user receives and executes a PDP data structure or PDP link. That is, at step 310 a file or other data structure representing a Protected Document Package (PDP), or a link, URL or other pointer to a file or other data structure representing a PDP is received and executed.

As previously noted with respect to step 265, the user may receive PDP information via e-mail, file transfer protocol, streaming media and so on. In one embodiment, the PDP file, data structure, or link thereto is included within an executable PDP or an executable container program including the PDP information. In this embodiment, the PDP file, data structure or link thereto is executed/instantiated by the user. In another embodiment, a client program resident at the receiving computer is used to execute/instantiate the received PDP file, data structure or link.

At step 320, one or more existing licenses associated with the user (e.g., stored as Content Consumer License files) are compared to the received PDP licensing and/or operating requirements to determine whether the received PDP license and/or operating requirements are satisfied. Referring to box 325, this comparison contemplates one or more of comparing Publisher Keys PK or tiered Publisher Keys, license start and expiry dates/times, various licensing terms, licensing types and other licensing constraints, or other license and/or operating requirements.

At step 330, a determination is made as to whether the received PDP license and/or operating requirements were satisfied at step 320. If the received PDP license and/or operating requirements were satisfied at step 320, then the method 300 proceeds to step 340. Otherwise, the method 300 proceeds to step 360.

At step 340, the securely published data file is stored within an encrypted temporary package on the local machine (i.e., the receiving user device/computer). In the case of a securely published streaming media file, some or all of the securely published streaming media file may be stored within an encrypted temporary package and the local machine. In the case of a link to a securely published data file or streaming media file, some or all of the content associated with that link may be stored within an encrypted temporary package and the local machine. As an example, if the securely published data file comprises a Microsoft PowerPoint file, the Microsoft PowerPoint file is stored within an encrypted temporary package and the local machine.

At step 350, the securely published data file or streaming media is presented using a Limited Capability Viewer LCV, such as a protected mode of a native program associated with the securely published data file streaming media or a standalone viewer program. Referring to box 355, a limited capability viewer program is retrieved if needed. The native program operating in a protected mode of operation, as well as the Limited Capability Viewer LCV program, do not have the capability to print, e-mail or otherwise transfer the content of the securely published data file or streaming media. In this manner, the authorized user may only present the securely published data file or streaming media within the date, time or other license constraints.

It is noted that the protected mode of the native program or limited capability viewer is used to present an encrypted file or portion thereof. The encryption and local storage of the securely published data file, as well as the decryption/presentation by the native program or Limited Capability Viewer LCV is invoked without user interaction.

The Limited Capability Viewer LCV may comprise a standalone program or a subset of the functionality associated with a program natively adapted to present the securely published data file or streaming media. In one embodiment, the Limited Capability Viewer LCV or a link thereto is included within the PDP. In one embodiment, the limited capability viewer is associated with a client program resident at the content consumer user device.

If the received PDP license and/or operating requirements were not satisfied at step 320, then at step 360 a Content Consumer License Request (CCLR) is generated for the content owner or content source. Referring to box 365, the CCLR includes one or more of a request for a specified publisher key necessary to view the contents within the PDP data structure, content consumer details such as identification of proposed authorized user(s), group of users, domain of users and the like, payment details as appropriate, content delivery details such as destination e-mail address, domain or IP address(es) associated with proposed authorized user(s), desired key or tier, number of keys requested and/or other information pertinent to enabling the content owner or source to determine whether or not access to secure content should be granted, as well as the conditions associated with that access.

At step 370, the CCLR is transmitted towards the content owner or source, and at step 380, the method waits to receive a Content Consumer License CCL from the content owner or source. As previously noted, the CCL may be delivered via email, web, optical media, magnetic media, semiconductor media or any other electronic transmission, software or hardware delivery method.

At step 390, a determination is made as to whether a CCL has been received, such as received within a predefined period of time. If a CCL is not received within a predefined period of time, or a CCL request denial has been received, then the method 300 exits at step 395. If a CCL is received, then the CCL is stored at step 394 and the method 300 proceeds to step 320.

In various embodiments, step 320 (and/or box 325) is modified to enable the use of PDP content in accordance with various advanced permissions. Further, the comparison formed at step 320 may be modified to ensure that the advanced permissions associated with an existing CCL do not exceed the advanced permissions associated with PDP licensing requirements. As an example, if desired advanced permissions exceed the advanced permissions associated with PDP licensing requirements, a new CCL is necessary to use PDP content in accordance with the desired advanced permissions.

In various embodiments, step 360 (and/or box 365) is modified to enable the requesting of desired advanced permissions via the CCLR. That is, for embodiments utilizing an advanced permissions option, the CCLR generated by an unauthorized (not yet authorized) may include an advanced permissions request. The advanced permissions request may be conveyed within the CCLR using any of several techniques. For example, the CCLR may include an advanced permissions byte, word data element and/or message wherein various bits, flags or fields may be used to specify individual advanced permissions or predefined groups of advanced permissions. Such advanced permissions may comprise, illustratively, selectively allowing an authorized user to modify, save and/or print protected content, defining a number of times an authorized user may modify, save and/or print protected content, defining a duration or viewing time for viewing protected content and/or other advanced permissions described herein.

Figure 4:
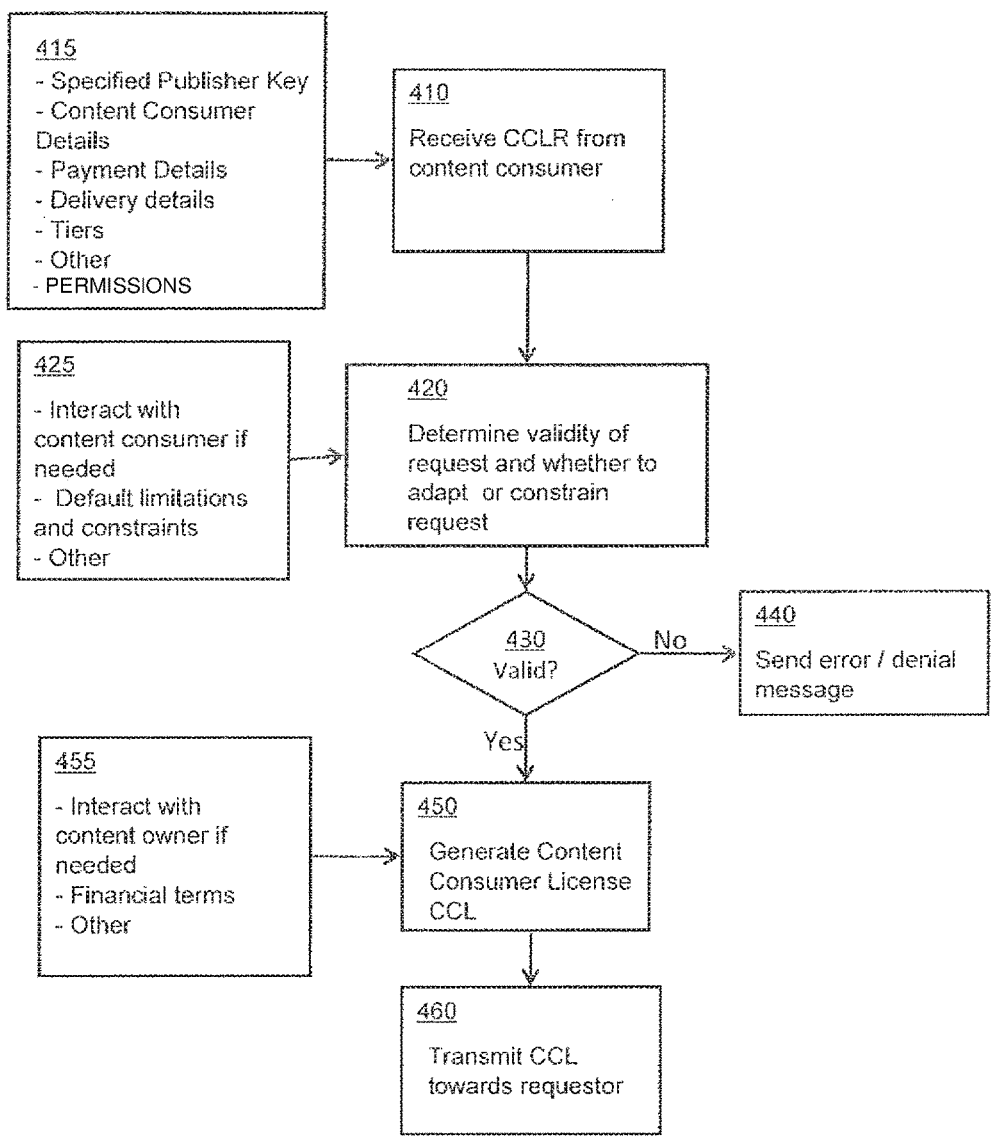
FIG. 4 depicts a flow diagram of a method for processing a content consumer license request suitable for use in various embodiments.

FIG. 4 depicts a flow diagram of a method for processing a Content Consumer License Request CCLR suitable for use in various embodiments. Specifically, the method 400 of FIG. 4 is adapted to generating one or more Content Consumer Licenses (CCL) as appropriate in response to a Content Consumer License Request (CCLR) from a user, such as discussed above with respect to FIG. 3. The method 400 may be invoked within the context of a licensing engine LE of a user device 105 or server 107 implementing the secure content sourcing/publication methodologies of the various embodiments.

At step 410, a Content Consumer License Request (CCLR) is received from a user or other presentation entity. Referring to box 415, the CCLR includes some or all of the information described above with respect to box 365; namely, one or more of a request for a specified publisher key necessary to view the contents within the PDP data structure, content consumer details such as identification of proposed authorized user(s), group of users, domain of users and the like, payment details as appropriate, content delivery details such as destination e-mail address, domain or IP address(es) associated with proposed authorized user(s), desired key or tier, number of keys requested and/or other information pertinent to enabling the content owner or source to determine whether or not access to secure content should be granted, as well as the conditions associated with that access.

At step 420, a determination is made as to whether the received CCLR is valid and whether it is appropriate to adapt or constrain the request. Referring to box 425, interaction with the content consumer may be needed to determine the validity of the request and any appropriate adaptations/constraints to be applied to the request. Alternatively, default limitations and/or constraints may be applied. Other actions may also be taken in response to the request.

At step 430, if the determination at step 420 indicates that the request is not valid, then the method 400 proceeds to step 440 where an error/denial message is transmitted toward the requesting user/presentation entity.

At step 430, if the determination at step 420 indicates that the request is valid, then the method 400 proceeds to step 450 where one or more Content Consumer License (CCL) files are generated either as requested or according to any adaptations or constraints. Referring to box 455, interaction with the content owner or other entities is provided as needed to retrieve data for inclusion within the generated CCL file or files. Additionally, interaction with the content owner or other entities such as bank or credit card processing entities is provided as needed to confirm satisfaction of financial terms associated with the CCL.

At step 460, the generated CCL file or files are transmitted toward the requesting user/presentation entity.

Optionally, advance permissions may be requested within the context of the CCLR. Such advanced permissions will be described in more detail below. Such advanced permissions may comprise, illustratively, selectively allowing an authorized user to modify, save and/or print protected content, defining a number of times an authorized user may modify, save and/or print protected content, defining a duration or viewing time for viewing protected content and/or other advanced permissions described herein.

For embodiments utilizing advanced permissions, the CCLR received at step 410 may include request for advanced permissions, step 420 may include determining whether the advanced permissions request is valid and/or should be constrained in some manner (i.e., grant all, none or a subset of requested advanced permissions), and step 450 may include generating a CCL with information indicative of any advanced permissions granted to the content consumer such that the content consumer (authorized user) may use the content in accordance with the granted advanced permissions.

Figure 5:
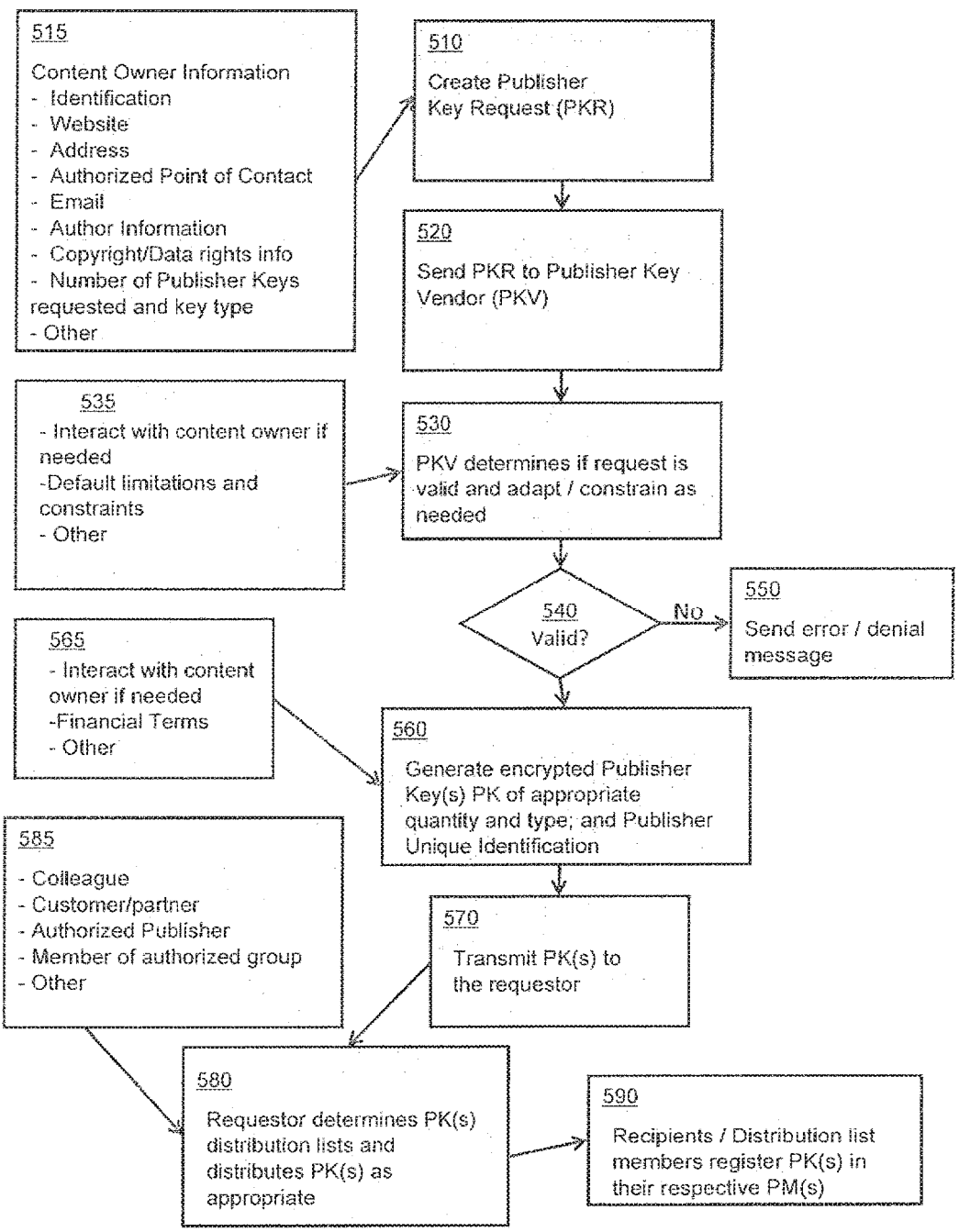
FIG. 5 depicts a flow diagram of a method for processing a publisher key request suitable for use in various embodiments.

FIG. 5 depicts a flow diagram of a method for processing a publisher key request suitable for use in various embodiments. Specifically, the method 500 of FIG. 5 is adapted to generating one or more Publisher Keys (PK) as appropriate in response to a Publisher Key Request (PKR) from a content publisher or content distributor. The method 500 may be invoked within the context of a licensing engine LE of a user device 105 or server 107 implementing the secure content sourcing/publication methodologies of the various embodiments.

At step 510, a Publisher Key Request (PKR) is created. Referring to box 515, the PKR is created using content owner or content source information such as Identification, Website, Address, Authorized Point of Contact, Email, Author Information, Copyright or digital rights management (DRM) information, a Number of Publisher Keys requested and key type as well as any other information suitable for use in creating the PKR.

At step 520, the created (or existing) PKR is propagated toward a Publisher Key Vendor (PKV).

At step 530, the PKV determines if the PKR is valid and whether it is appropriate to adapt or constrain the request. Referring to box 535, interaction with the content owner may be needed to determine the validity of the request and any appropriate adaptations/constraints to be applied to the request. Alternatively, default limitations and/or constraints may be applied. Other actions may also be taken in response to the request.

At step 540, if the determination at step 530 indicates that the request is not valid, then the method 500 proceeds to step 550 where an error/denial message is transmitted toward the requesting content publishing entity.

At step 560, if the determination at step 530 indicates that the request is valid, then the method 500 proceeds to step 560 where one or more encrypted Publisher Key(s) PK are generated either as requested or according to any adaptations or constraints. A Publisher Unique Identification is also associated with the generated PK(s). Referring to box 565, interaction with the content owner or other entities is provided as needed to retrieve data for inclusion within the generated PK file or files. Additionally, interaction with the content owner or other entities such as bank or credit card processing entities is provided as needed to confirm satisfaction of financial terms associated with the PK.

At step 570, the generated PK file or files are transmitted toward the requesting content distribution entity.

At step 580, the requesting content distribution entity determines the distribution list associated with the generated PK file or files and accordingly distributes the generated PK file or files. Referring to box 585, the distribution list may be defined in terms of one or more colleagues, customers and partners, authorized publishers, members of authorized groups and/or using other determinative terms.

At step 590, members of the distribution list having received the generated PK file or files register the received publication key(s) PK with their respective presentation module PM to enable thereby secure presentation of the content.

Figure 6:
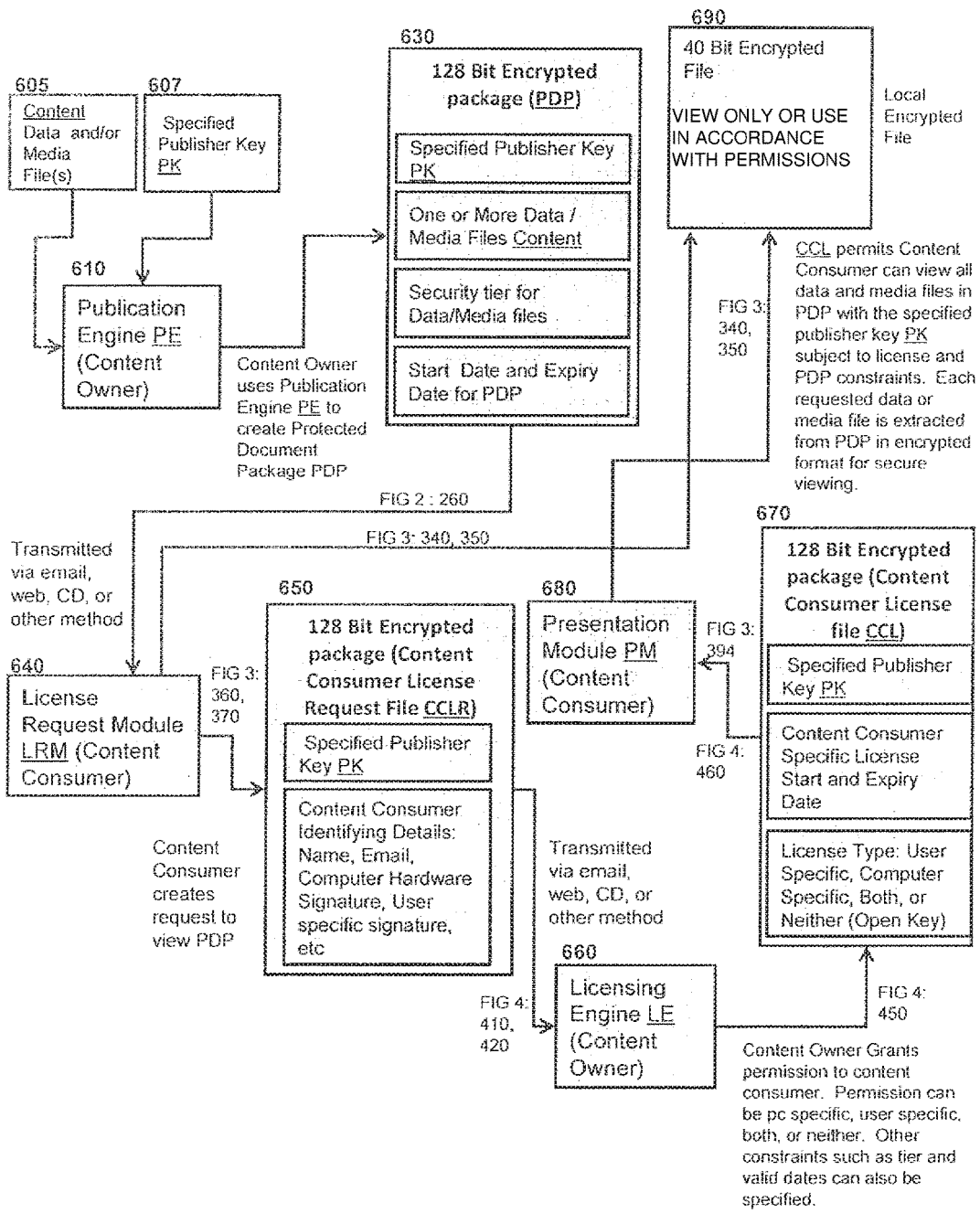
FIG. 6 graphically depicts an embodiment of the invention.

FIG. 6 graphically depicts an embodiment of the invention. Specifically, FIG. 6 depicts various interactions by elements within the various embodiments described herein with respect to FIGS. 1-5. Generally speaking, the various embodiments described herein contemplate a systems, apparatus, software, firmware and so on adapted to enable a content owner to create a protected document package for distribution to one or more end users for protected presentation. It is noted that the reference designators used in FIG. 6 coincide with reference designators used in the various other figures.

The content owner specifies the data and/or media files (box 605) and a publisher key PK (box 607) and uses a Publication Engine or Publisher (box 610) to create a Protected Document Package (PDP) that includes the data and/or media files, the specific Publisher Key PK, start and expiry dates for the protected document package and other licensing criteria/constraints (box 630) as previously discussed with respect to the various figures.

The PDP comprises, illustratively, a 128 bit encrypted data package or file. The PDP may be formed as a plurality of files bundled together such as a database file, a group of files and the like.

The content owner may use multiple publisher keys and may create multiple Protected Document Packages with each key. Thus the content owner can decide who, what, and when content consumers can view the contents of the files created by the content owner. Further, the content owner need not know the identity of the users authorized to view the Protected Document Packages at the time of creation of the protected document packages.

The end user receives the protected document package PDP from a content owner or other source via e-mail, FTP, optical media, magnetic media or other means and the LRM on user device 105 or server 107 of content consumer determines if the user has an existing and valid license for opening the Protected Document Package PDP. Existing licenses contain information about the Publisher Key PK specified for each license, the valid dates of the license, and information about license type. License types can be user specific, computer specific, both user and computer specific, or neither.

If the specified publisher key of the protected document package does not match the Publisher Key of any of the Publisher License Files on the user's computer, or if the date or license type is not valid, then the end user will be instructed to create a license request and send it to the content owner. As previously noted, the CCL may be delivered via email, web, optical media, magnetic media, semiconductor media or any other electronic transmission, software or hardware delivery method. For example, the CCL may be delivered via a hardware means such as a USB memory device, an SD memory device or other semiconductor memory device; a CD ROM, DVD or other optical memory device; or a hard disk drive, mass storage device or other media including thereon software instructions representing the CCL.

A hardware device provided the CCL may be constrained to a particular type of device (i.e., an approved device), such as a specific type or capacity of memory device. In various embodiments, the hardware device is merely used to deliver the CCL. In other embodiments, the hardware device including the CCL is necessary for presentation by the LCV. That is, the CCL operates as a hardware key to provide secure access or presentation of content.

For example, in one embodiment an entity such as an employer (content source) provides its employees (content consumers) with a specific type of hardware key that must be used to present the content. The employee must have the hardware key inserted in the computer to present the content.

For example, the CCL may be delivered via a hardware means such as a USB memory device, an SD memory device or other semiconductor, optical and/or magnetic memory device. (box 640).

The content owner has the option to grant permission to the end user. In particular, a License Request Module (LRM) operates to send a Content Consumer License Request (CCLR) to the content owner (box 650). The content owner, at its option, can grant (box 660) the end user a license for the specified license key. In the license, the content owner can also specify a license type which designates if the license is user specific, computer specific, both user and computer specific, or neither and can also specify valid start and expiry date of license (box 670).

Publisher Keys are used to restrict access to Protected Document Packages. Publisher Key Requests include, illustratively, identity of the requestor, the content owner, and allow the content owner to specify the publisher key type (single tier or multiple tier) and the number of keys requested. A multiple tier key type allows publishers to specify multiple security tiers for files in a Protected Document Package while a single tier key allows for only security group within a Protected Document Package. A key distribution program operated by the Publisher Key Vendor PKV accepts the Publisher Key Requests PKR and generates Publisher Key PK files for each key requested. The process for Publisher Key Requests PKR and Publisher Key PK distribution is illustrated in FIG. 5.

If the specified Publisher Key PK for an existing Content Consumer License matches the specified Publisher Key PK of the Protected Document Package PDP, and the date and license type are valid, then the user is able to access data files from the Protected Document Package PDP.

When the end user selects a data file from the Protected Document Package PDP, it is extracted into an encrypted temporary package (box 690) and displayed to the user using the corresponding Limited Capability Viewer LCV through, illustratively, methods for transferring data between applications such as object linking and embedding, dynamic data exchange, or related technology. The end user is prevented from printing, saving, or copying information from the data file. When the data file is closed, the temporary encrypted package is removed from the user's computer.

Various embodiments assume a default level of permissions; namely, that the extracted data file of box 690 may only be viewed by the authorized user. Optional embodiments provide advanced permissions capability as discussed below. In these embodiments, the extracted data file of box 690 may be used in accordance with the advanced permissions granted to the authorized user. Such advanced permissions may comprise, illustratively, selectively allowing an authorized user to modify, save and/or print protected content, defining a number of times an authorized user may modify, save and/or print protected content, defining a duration or viewing time for viewing protected content and/or other advanced permissions described herein.

The various embodiments allow the buyer of a Publisher Key PK to create a content owner group by sharing the publisher key with one or more individuals. All such individuals can create Protected Document Packages PDP to share within the group and they can also grant end-user licenses to Protected Document Packages created by any individual using the shared key.

Figure 7:
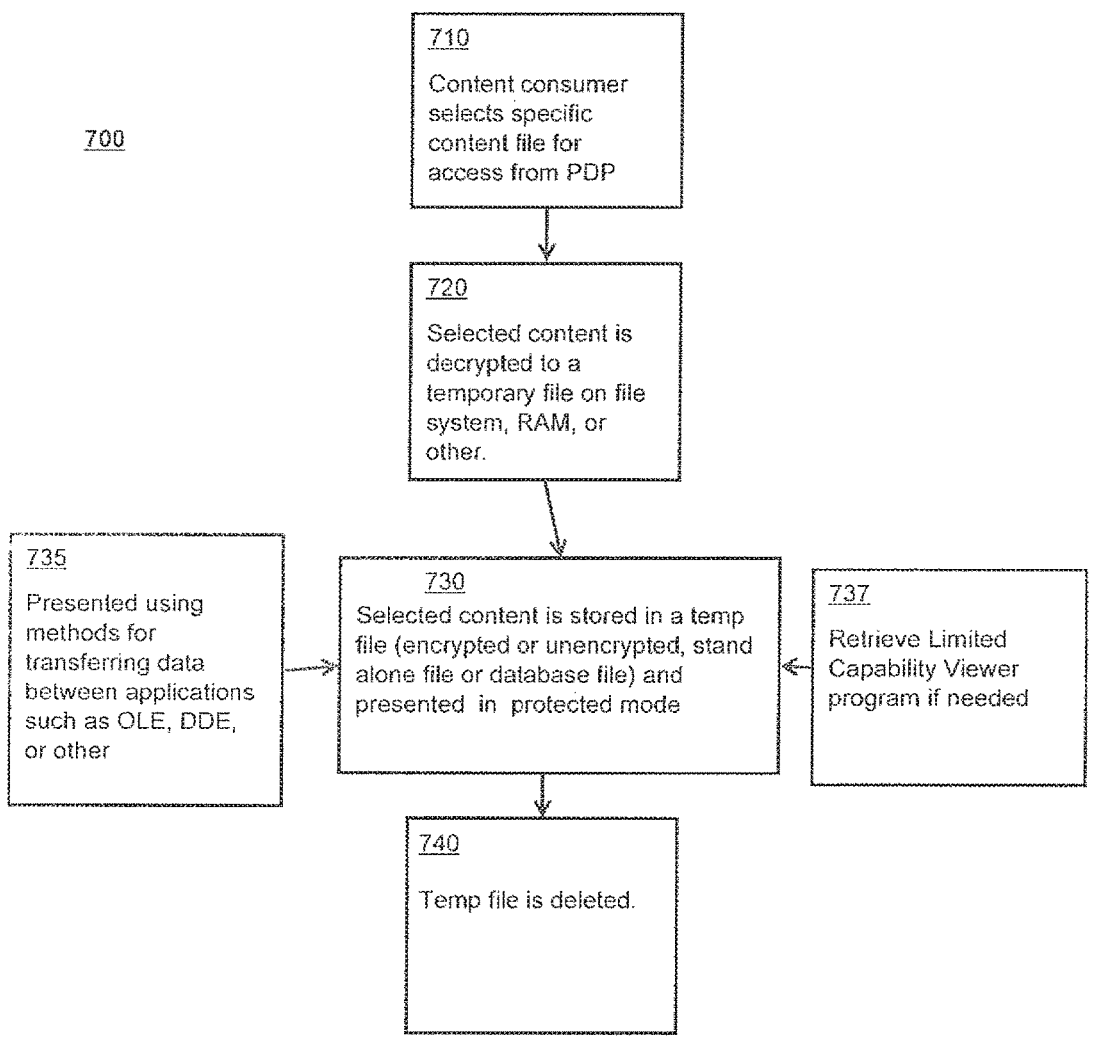
FIG. 7 depicts a flow diagram of a method for opening a Protected Document Package (PDP) and presenting content via a temporary file.

FIG. 7 depicts a flow diagram of a method for opening a PDP and presenting content via a temporary file. This method advantageously provides improved memory management capabilities as compared with methods for directly presenting a PDP, such as discussed below with respect to FIG. 8.

At step 710, the content consumer selects a specific content file for access from the PDP. For example, the PDP may comprise any suitable database file format, such as a format supported by Microsoft's Access database program, FileMaker's FileMaker Pro database program, any of the open source database programs, for use by Access (or other Microsoft program), FileMaker Pro (or other FileMaker, Inc. program), Oracle database (or other Oracle database program), or any of the open source database programs or formats. Generally speaking, individual content files and/or content file components may be stored or referred-to via fields within the PDP database file.

At step 720, the selected content is extracted or decrypted from the PDP file as a temporary file on the file system of the user device, a memory portion such as random access memory (RAM) on or associated with user device, or other data storage means.

At step 730, the selected content is stored in a temporary encrypted standalone file or database file or unencrypted standalone file or database file that is suitable for presentation in a protected mode of operation by a Limited Capability Viewer LCV program.

Referring to box 737, the limited capability viewer program is retrieved as needed. In various embodiments, the Limited Capability Viewer program is of a type typically available at user devices, such as a PowerPoint viewer within the Microsoft Office suite of programs. In various embodiments, the limited capability viewer program or a corresponding URL is included within the PDP.

Referring to box 735, the limited capability viewer program may present the content using methods for embedding and transferring data between applications such as Object Linking and Embedding (OLE), Dynamic Data Exchange (DDE) or other techniques enabling the extraction of content-representative objects from an encrypted or unencrypted file such that presentation of such objects by the Limited Capability Viewer LCV is performed in a secure manner.

At step 740, the temporary encrypted standalone file or database file, or unencrypted standalone file or database file, is deleted.

Figure 8:
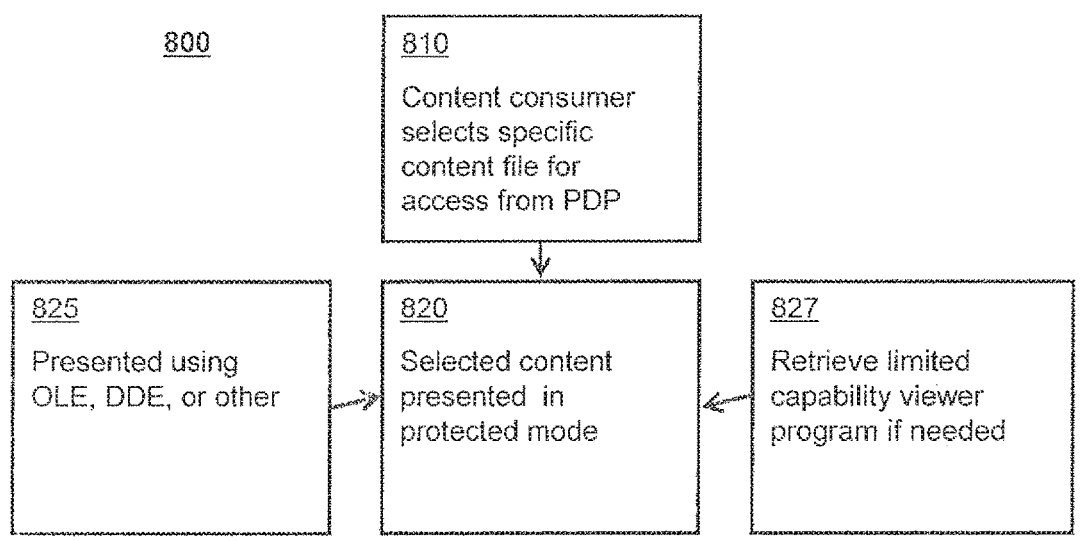
FIG. 8 depicts a flow diagram of a method for opening a Protected Document Package PDP and presenting content directly.

FIG. 8 depicts a flow diagram of a method for opening a PDP and presenting content directly from the PDP. This method advantageously provides improved security and performance capabilities as compared with methods for opening a PDP and presenting via temporary files, such as discussed above with respect to FIG. 7.

At step 810, the content consumer selects a specific content file for access from the PDP. For example, the PDP may comprise a database file format for use by the Microsoft Access database program or some other database program such as FileMaker, wherein individual content files are stored or referred-to via fields within the PDP database file.

At step 820, the selected content is extracted or decrypted from the PDP file and directly presented in a protected mode by the limited capability viewer program.

Referring to box 827, the Limited Capability Viewer LCV program is retrieved as needed. In various embodiments, the Limited Capability Viewer LCV program is of a type typically available at user devices, such as a PowerPoint viewer within the Microsoft Office suite of programs. In various embodiments, the limited capability viewer program or a corresponding URL is included within the PDP.

Referring to box 825, the Limited Capability Viewer LCV program may present the content using methods for embedding and transferring data between applications such as Object Linking and Embedding (OLE), Dynamic Data Exchange (DDE) or other techniques enabling the Limited Capability Viewer LCV program to securely present the content.

It will be appreciated by those skilled in the art that while various terms have been used to describe content providing entities such as content owner, content source, content publisher, content distributor, content rights holder and the like, these entities may comprise a single entity. In various embodiments, such as where a content owner is a different entity than a content distributor, the content owner may require that content be distributed according to specific file formats, encryption levels, quality levels and the like. In these embodiments, the content distributor will accept the appropriately formatted content from the content owner (or format the content as appropriate), and propagated content according to the required file format, encryption level, quality level and the like.

Generally speaking, the various rights associated with a particular content element may be defined by any of a content owner, content source, content distributor and/or content rights holder depending upon the contractual arrangements between these entities.

Various embodiments described herein contemplate methods, apparatus, systems, tools, software development kits, computer readable media, computer program products and the like operative to enable the secure distribution of content.

Various additional embodiments are also contemplated by the inventors, including embodiments clarified herein and fully supported by FIGS. 1-8 and the above portions of the specification. Various additional embodiments are supported by the combination of FIGS. 1-8 and the above portions of the specification and FIGS. 9-11 as discussed below.

Enhanced User Authentication or Authorization EUAA

Various embodiments provide for Enhanced User Authentication or Authorization EUAA adapted to identify authorized users via additional security/verification mechanisms invoked or supported by client side hardware or software functions. Such mechanisms may include digital signatures, a key or security certificate generated by and/or stored upon a portable memory and/or processing element such as a smart card or universal serial bus (USB), a biometric identifier such as a fingerprint or palm print, sampled voice pattern, retina image and the like. Such embodiments further enable ancillary applications such as verified authorization associated with documents (e.g., execution of documents), groups of documents, audiovisual presentations, ancillary materials associated with a PDP and so on.

Thus, various embodiments provide that EUAA information may include content consumer details including personal identification indicia in addition to computer, domain, hardware, and software identification, including, but not limited to biometric information, fingerprints, face and eye recognition, handwritten signature and its properties (gait and pressure in signature), externally provided security encryption keys (e.g., Fortezza crypto cards), voice recognition, or other personal identification methods.

Functionality supporting these personal identification techniques may be incorporated into the processes for CCLR creation (e.g., such as, illustratively, depicted and described with respect to at least FIG. 3 Block 360 and 365, and FIG. 6 block 650) and in the Presentation Module PM (e.g. such as depicted and described with respect to at least FIG. 3 blocks 340 and 350, and FIG. 6 Block 680). For example, the various methods may be adapted to include software adapted to instantiate or invoke at a user device a EUAA security/verification mechanism adapted to interact with the user device or user to recover the appropriate EUAA information for inclusion in a CCLR.

Thus, in various embodiments, the PDP includes information adapted to trigger user device submission of EUAA data, which may then be processed as part of a CCLR to determine if a CCL should be provided to the user. In other embodiments, the EUAA data is processed by the presentation module (PM), such as to check the validity of user personal identification information, certificates and/or signatures prior to displaying contents of PDP via the LCV to the user.

In various embodiments, content owners may utilize access to databases to authenticate CCLR requests from content consumers during the CCL generation process. These databases may contain information regarding crypto card ID numbers, biometric information, and other personal or corporate indicium. Input from databases may be used for Enhanced User Authentication or Authorization EUAA. The databases may be locally stored, accessed via a network connection, on a server, or other database host.

Virtual Private Network (VPN) Functions and Collaboration Techniques

Various embodiments provide additional capabilities with respect to online and off-line virtual private network (VPN) functions and collaboration techniques. In particular, various embodiments enable users to modify or change (e.g., edit) content within the encrypted package and then store the modified version in the same or another protected package. In some embodiments, an authorized user receiving a PDP via a secure tunnel or VPN is enabled to modify the PDP content via interaction with a server or content provider such that subsequent distribution of the PDP will include such modifications. Specifically, the PDP may further include information adapted to enable PDP content modification. Such information may comprise additional software adapted to be invoked at a user device, or information adapted to trigger software already resident at the user device.

For example, various embodiments such as those described above are modified in that an encrypted file presented to the end user through the LCV can be opened in either "View Mode", "Edit Mode", or both, such as at step 690 in the method 600 of FIG. 6. In various embodiments, the end user is enabled to make changes to the data in the PDP presented in the LCV and save those changes in that PDP (such as, illustratively, at steps 210 through 250 in the method 200 of FIG. 2), or another PDP as permitted by the publisher. The changed PDP can be sent for consumption to other users who have a CCL for the PK used to encrypt the PDP and/or to the content owner. Users who do not have a CCL for the PK used to encrypt the PDP must follow the CCLR process in order to view or edit the content.

In one embodiment, LCV operation is modified to include an editing mode enabling editing of a PDP document. In one embodiment, the entire updated PDP document is propagated from the authorized user via the secure tunnel or VPN to a server or content provider. In one embodiment, only the specific updates or changes made to the PDP by the authorized user are propagated from the authorized user via a secure tunnel or VPN to the server or content provider.

In various embodiment, this propagation of some or all of the PDP document is triggered in response to a "save" command or "save and publish" command invoked by the authorized user interacting with the LCV In other embodiments, this propagation is periodic or otherwise automatically provided.

Similarly, at the server or content provider, received PDP modifications such as full or partial updates/changes are in turn used to update the relevant PDP. The updated PDP is then propagated toward other authorized users periodically, or in response to an indication that the modified PDP is ready for publication/distribution to other authorized users.

Automatic Distribution of a Content Consumer License (CCL)

Various embodiments provide for the automatic distribution of a Content Consumer License (CCL). For example, in some of these embodiments publishers may use automated systems to distribute CCLs to content consumers to facilitate thereby free distribution of content while collecting consumer data for marketing and other purposes. In various embodiments, a CCL compatible with the encrypted PK is managed by an automated software, executable code, web site, or hardware.

In an embodiment depicted in, illustratively, FIG. 4, the validity of the CCLR and delivery of the CCL, as represented by blocks 420 through 460, is managed by an automated software, executable code, web site, and/or hardware system. That is, distribution of a PDP toward a plurality of authorized users is performed in an automatic manner in accordance with a list of authorized users associated with the PDP, where the PDP is updated in response to adding (authorizing) or subtracting (deauthorizing) authorized users associated with the PDP.

Watermarking of Documents

Various embodiments provide for the visible or hidden (i.e., steganography) watermarking of documents. Specifically, the PDP may further include information adapted to trigger watermarking of a document presented via an LCV indicative of the user associated with the LCV. Such information may comprise additional software adapted to be invoked at a user device, or information adapted to trigger software already resident at the user device. For example, some embodiments include watermarks in the information presented in the LCV (Limited Capability Viewer) to identify or provide information pertaining to the user, the PDP or document within the PDP, the publisher of the document, the grantor of the CCL, the user computer, the presentation device, the LCV and/or other information. This information can be used in case someone photographs the screen or otherwise records protected audio or video.

The watermarks can be fixed or moving imagery/pixels, a stream of imagery/pixels (e.g., such as for video presentations), and/or audio information embedded in audio files or audiovisual files which are presented via the LCV such that copying of the presented information (e.g., via a camera or other image or sound recording device) will likely include copying of the watermarking. For example, in various embodiments the LCV is adapted to include identifying pixels, a stream of pixels, audio information, or other information to thereby identify any of the PK, CCL, and the like associated with the PDP and/or the specific authorized user or LCV.

In an embodiment of the invention, the Presentation Module PM may add certain content consumer details, Publisher Key details, and/or other identification details to the presentation of the PDP via LCV. These details may be encrypted as a set of pixels, steganographic features, a stream of audio bits, a string of video features, or other. The step when this process occurs is depicted in, illustratively, FIG. 3 blocks 340 and 350 and FIG. 6 Block 680.

Figure 9:
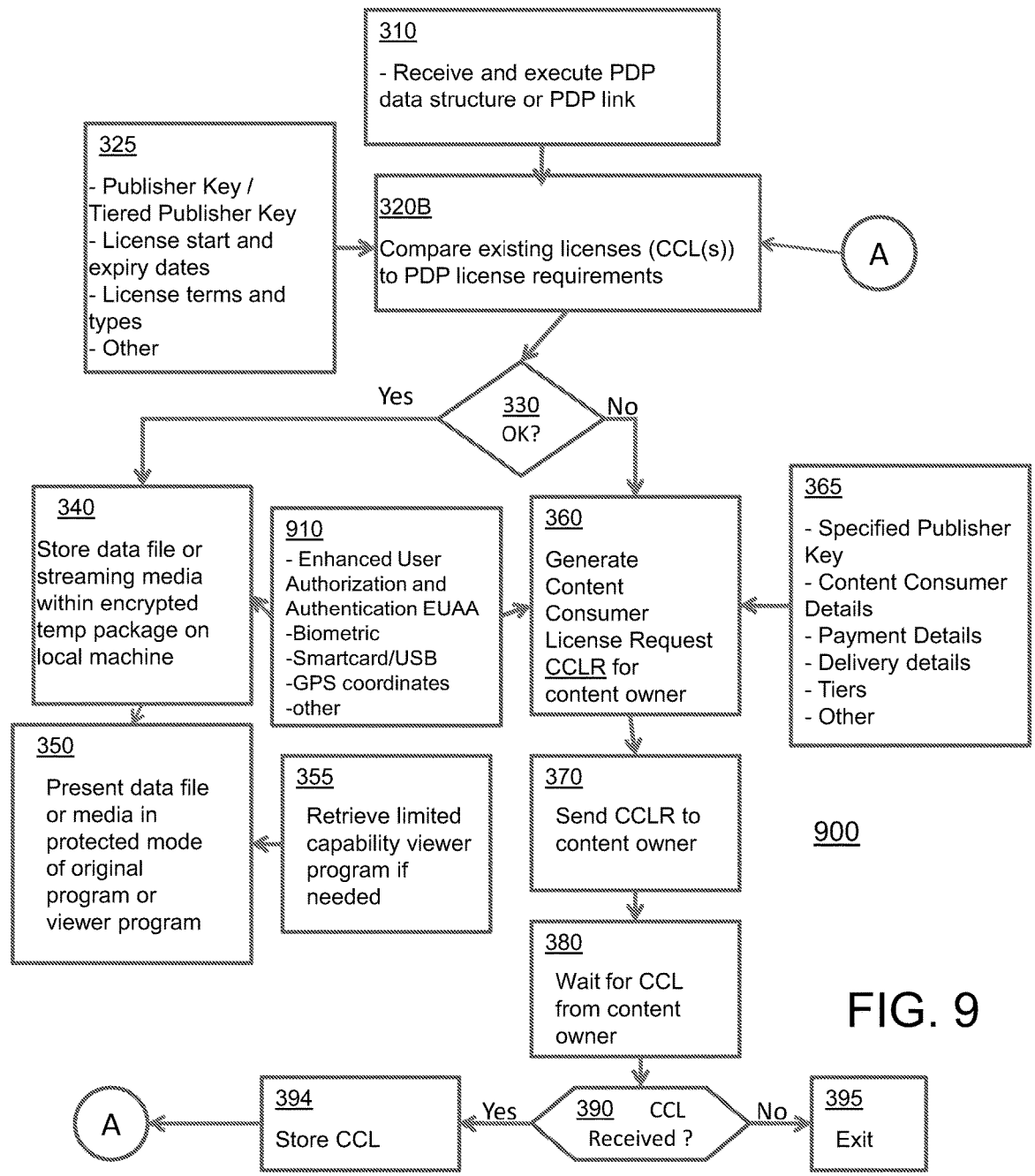
FIG. 9 depicts a flow diagram of a secure content presentation method according to one embodiment.

FIG. 9 depicts a flow diagram of a secure content presentation method according to one embodiment. Specifically, the method 900 of FIG. 9 is adapted to process a received PDP or PDP container to securely present the associated content. The method 900 may be invoked within the context of a presentation module PM and/or license request module LRM of a user device 105 implementing the secure content consumption/presentation methodologies of the various embodiments.

The method 900 of FIG. 9 is similar in many respects to the method 300 discussed above with respect to FIG. 3 and includes many of the same elements. In particular, elements 310-395 of the method 900 of FIG. 9 are substantially similar to corresponding elements 310-395 of the method 300 of FIG. 3 and, as such, will generally not be described in more detail herein.

The method 900 of FIG. 9 modifies the method 300 of FIG. 3 to provide several additional features/enhancements. In particular, the method 900 includes element 910 which operates to modify one or both of steps 340 and 360.

At step 340, where a user/recipient of a PDP is in possession of the appropriate CCL associated with the PDP (i.e., an authorized user where the received PDP license and/or operating requirements are satisfied), a securely published data file is stored within an encrypted temporary package on the local machine (i.e., the receiving user device/computer). In the case of a securely published streaming media file, some or all of the securely published streaming media file may be stored within an encrypted temporary package and the local machine. In the case of a link to a securely published data file or streaming media file, some or all of the content associated with that link may be stored within an encrypted temporary package and the local machine. As an example, if the securely published data file comprises a Microsoft PowerPoint file, the Microsoft PowerPoint file is stored within an encrypted temporary package and the local machine.

At step 360, where a user/recipient of a PDP is not in possession of the appropriate CCL associated with the PDP (i.e., an unauthorized user where the received PDP license and/or operating requirements are not satisfied), a Content Consumer License Request (CCLR) is generated for the content owner or content source.

In various embodiments, either or both of steps 340 and 360 are modified in that the step is not performed unless a security/verification mechanism indicates that the user (or user equipment) needs certain security/authorization criteria. Specifically, referring to element 910, the security/verification mechanism may comprise any of an Enhanced User Authorization and Authentication (EUAA) mechanism, a biometric mechanism, a smart card or universal serial bus (USB) security mechanism, recipient GPS coordinates or other security/verification mechanism.

Figure 10:
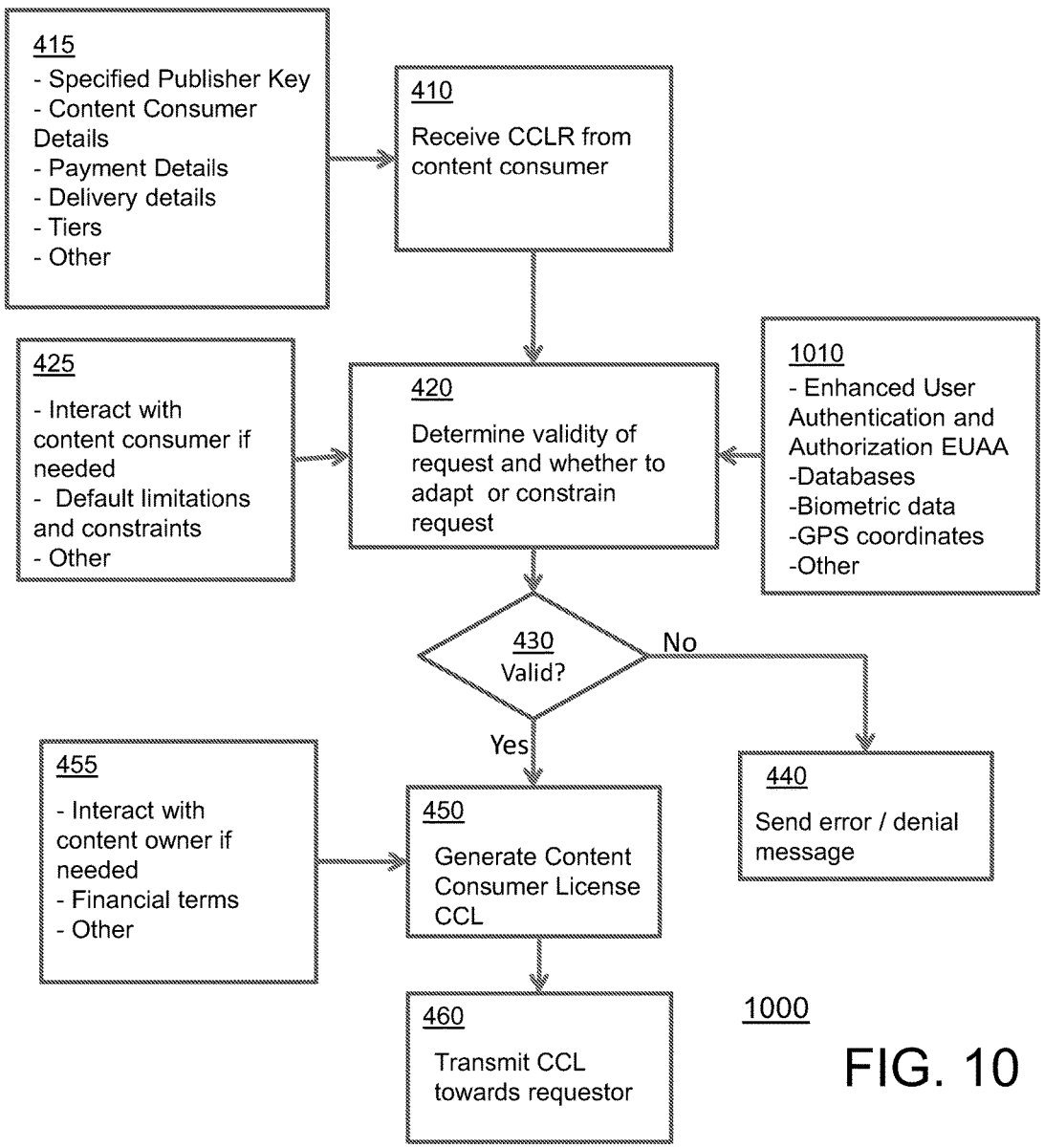
FIG. 10 depicts a flow diagram of a method for processing a content consumer license request suitable for use in various embodiments.

FIG. 10 depicts a flow diagram of a secure content presentation method according to one embodiment. Specifically, the method 1000 of FIG. 10 is adapted to process a received CCLR or CCLR container to determine the validity of the CCLR. The method 1000 may be invoked within the context of a Licensing Engine LE of a user device 105 implementing the secure content consumption/presentation methodologies of the various embodiments.

The method 1000 of FIG. 10 is similar in many respects to the method 400 discussed above with respect to FIG. 4 and includes many of the same elements. In particular, elements 410-460 of the method 1000 of FIG. 10 are substantially similar to corresponding elements 410-460 of the method 400 of FIG. 4 and, as such, will not be described in more detail.

The method 1000 of FIG. 10 modifies the method 400 of FIG. 4 to provide several additional features/enhancements. In particular, the method 1000 includes element 1010 which operates to modify step 420.

At step 420, a determination is made as to whether the received CCLR is valid and whether it is appropriate to adapt or constrain the request. Referring to box 425, interaction with the content consumer may be needed to determine the validity of the request and any appropriate adaptations or constraints to be applied to the request. Alternatively, default limitations and/or constraints may be applied. Other actions may also be taken in response to the request.

In various embodiments, step 420 is modified in that the step is not performed unless a security/verification mechanism indicates that the user (or user equipment) needs certain security/authorization criteria. Specifically, referring to box 1010, the security/verification mechanism may comprise any of an Enhanced User Authorization and Authentication (EUAA) mechanism, a biometric mechanism, a smart card or universal serial bus (USB) security mechanism, recipient GPS coordinates or other security/verification mechanism.

Content Transfer Rules

Various embodiments enable users to specify rules that will govern Content Transfer from inside a network, inside a domain, or inside a trusted area such as a device or group of devices to outside a network, outside a domain, or to a non-trusted area, respectively. These rules may be set by a system administrator, by an organization seeking to prevent important content from leaving protected areas without protection and so on. These rules may be selected to control packet ingress/egress (PDP packet or otherwise) via firewall implementations and the like.

In various embodiments, the PDP may further include information adapted to enable authorized users to generate rules for controlling a user device, router and the like. Such information may comprise additional software adapted to be invoked at a user device, or information adapted to trigger software already resident at the user device. Rules may be provided directly from a content owner or other entity to the users, or included within a PDP.

Figure 11:
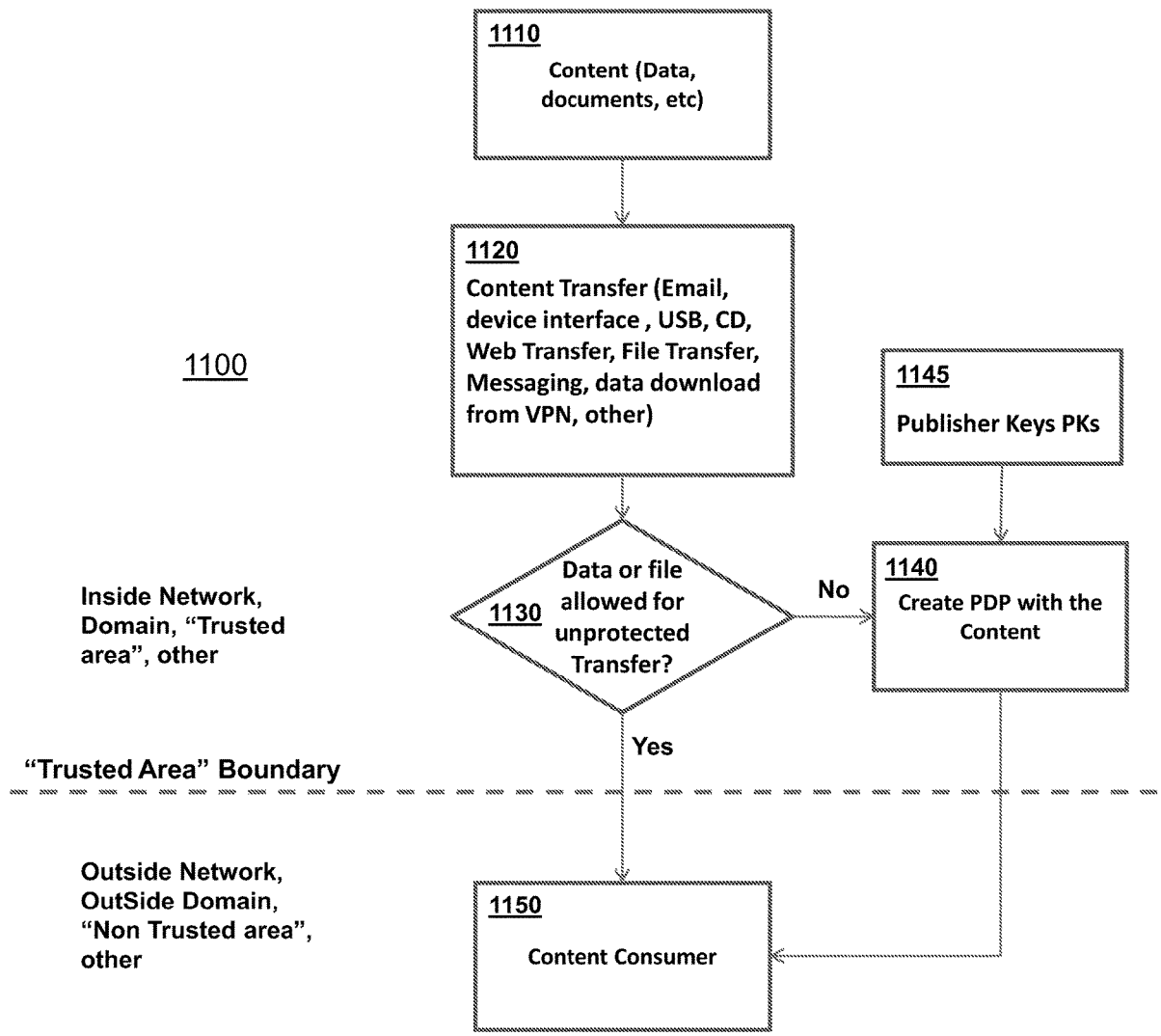
FIG. 11 graphically depicts an embodiment of the invention.

FIG. 11 depicts a graphical representation of an embodiment of the invention. Specifically, FIG. 11 depicts a representation 1100 of content transfer operations associated with a trusted area boundary; namely, operations associated with a trusted entity, area or domain (elements 1110-1145) and elements associated with an outside or non-trusted entity, area or domain (element 1150).

At step 1110, a content owner or other trusted entity selects content to be processed for eventual transfer outside of a trusted area.

At step 1120, an attempt to transfer the content is made via any of various mechanisms, such as email, device-to-device interface, USB connected media or device, CD/DVD or other optical media, network transfer such as via HTTP, HTTPS, FTP or other transfer protocol, Wireless Transfer (Wi-Fi, near field communication (NFC), Bluetooth and the like), file transfer, messaging, data download from a VPN or other channel and the like.

At step 1130, a determination is made as to whether the content itself or the type of content to be transferred is allowed or enabled for such unprotected transfer outside of the trusted area. This determination may be made using rules associated with a firewall, email server, device operating system, and/or other network element which are configured to examine the content or content type to make such determination.

If at step 1130 it is determined that the content may be transferred outside the trusted area, then the content is forwarded to a content consumer 1150.

If at step 1130 it is determined that the content may not be transferred outside the trusted area, then at step 1140 a PDP with the content is created. Referring to box 1145, publisher keys (PKs) and the like are used within the context of creating the PDP.

Generally speaking, step 1140 operates to dynamically create a PDP in accordance with the various PDP creation techniques discussed above where content is not permitted to be transferred outside of a trusted area without proper protection. The PDP created at step 1140 may be created in an automatic manner (i.e., without content provider or user interaction), or in a semi-automatic manner (i.e., where the content provider or user will be prompted to create the PDP prior to its transfer out of the trusted area). The PK is optionally selected in an automatic manner based on rules specified by the system, the system administrator, the content owner or some other entity. In various embodiments, content owner interaction or permission is necessary to enable the creation of the PDP at step 1140. The created PDP may also contain rules such as discussed above, including rules adapted to prevent unauthorized distribution/propagation of the unprotected document by the recipient of the PDP.

Selection of PK in various embodiments may take into account recipient information where applicable. For example if a specific PK is used with a particular email recipient or recipient domain, that information may be used for automatic PK selection. In various other embodiments, prior PK use information relating to content type or specific content may be used for PK selection. For example, if a specific PK was used for a specific file or content in the past, that information may be used for automatic PK selection.

After creation of the PDP at step 1140, if the content is to be transferred then it is in fact transferred or propagated "outside" of the trusted area toward the Content Consumer 1150 via the selected content transfer mechanism or means.

Advanced Permissions Option

Various embodiments contemplate the use of one or more advanced permissions mechanisms to enable a content owner and/or distributor to more finely control the use of protected content by an authorized user. Advanced permissions may be provided to a specific content consumer in response to a content consumer license request.

For example, based on the adjusted permissions defined by the PDP and/or the CCL, the LCV may permit users to do one or more of print, save, modify, copy content, limited view duration, share with other devices, share with other users, or interact with the content in other ways.

Advanced permissions may comprise, illustratively, selectively allowing an authorized user to modify, save and/or print protected content. Advanced permissions may also comprise defining a number of times an authorized user may modify, save and/or print protected content. For example, an authorized user may normally be prevented from modifying, saving and/or printing protected content. However, advanced permissions may enable an authorized user to modify but not save or print protected content, save but not modify or print protected content, print but not modify or save protected content, modify and print but not save protected content and so on.

Advanced permissions may also comprise defining a number of times an authorized user may view protected content. Advanced permissions may also comprise defining a viewing duration to thereby limit an amount of time an authorized user may view protected content.

In another embodiment, the PDP and/or the CCL may be configured to allow the ability to print a specified number of times (1, 2 10, or unlimited) in a specified time period. In another embodiment, the PDP and/or the CCL may be configured to allow the ability to modify the content a specified number of times with no time restriction. In another embodiment, the PDP and/or the CCL may be configured to allow the ability to save the content in another existing or new PDP. In some embodiments, the PDP and/or the CCL may be configured to allow the ability to view duration may be restricted to be only once opening of the PDP. In another embodiment, the view duration may be limited to a specific time interval such as the PDP may only be open for 30 seconds or for 10 minutes. In another embodiment, the PDP and/or the CCL may be configured to allow the ability to all or a portion of the content may be available for copy. In another embodiment, the PDP and/or the CCL may be configured to allow the ability to share the content with other devices belonging to the same authorized user. In another embodiment, the PDP and/or the CCL may be configured to allow the ability to share the content with other users who may or may not be authorized users.

Advanced permissions may be communicated via flags or bits forming a "permissions" byte, word data element and/or message as described above wherein respective flags or bit values that may be set to various states or levels to indicate thereby whether one or more advanced permissions are desired (e.g., indicated via CCLR) or granted (e.g., indicated via CCL). Thus, in various embodiments, the PDP and/or the CCL may be configured to adjust permissions of the content being presented via the LCV.

The embodiments described above contemplate advanced permissions enabling an authorized user to exceed permissions normally associated with a default permissions level (e.g., permissions beyond simply viewing protected content via a Limited capability viewer). In various embodiments, available advanced permissions are defined within the PDP itself. That is, of the numerous possible advanced permissions and combinations thereof, some advanced permissions may be limited irrespective of the particular advanced permissions granted to and authorized user. For example, content from a particular content provider may be limited to advanced conditions pertaining to viewing only, e.g., viewing the protected content three times where the first viewing is unlimited and the final two viewings have a maximum duration of one hour each. In this example, other advanced permissions granted via CCL to an authorized user (e.g., printing, modification etc.) are not honored by the LCV or other presentation, printing or modification mechanism. Stated differently, in various embodiments advanced permissions granted to an authorized user are limited by the LCV (or other mechanism) to available advanced permissions associated with protected content.

Although various embodiments which incorporate the teachings of the present invention have been shown and described in detail herein, those skilled in the art can readily devise many other varied embodiments that still incorporate these teachings.

What is claimed is:

1. A method for securely distributing content, comprising:
generating, at a server in communication with a network, a protected document package (PDP) including encrypted content or a link to encrypted content, a Publisher Key (PK) for decrypting said encrypted content for presentation of said content by an authorized user via a Limited Capability Viewer (LCV), and software instructions which, when executed by a processor at a user device of a proposed authorized user, cause said user device to generate a Content Consumer License Request (CCLR) identifying said PK, said authorized user comprising a user having a Content Consumer License (CCL) compatible with the PK to enable thereby said decryption of said encrypted content by said PK included within said PDP and use protected content in accordance with advanced permissions indicated via said CCL; propagating, via said network, the PDP toward at least one user; and
in response to receiving from a proposed authorized user a CCLR identifying said PK, propagating a CCL compatible with the PK toward said proposed authorized user.

2. The method of claim 1, wherein said advance permissions define a number of times an authorized user may view protected content.

3. The method of claim 1, wherein said advance permissions define an amount of time that an authorized user may view protected content.

4. The method of claim 1, wherein said advance permissions define whether an authorized user may print protected content.

5. The method of claim 4, wherein said advance permissions define a number of times an authorized user may print protected content.

6. The method of claim 1, wherein said advance permissions define whether an authorized user may modify encrypted content.

7. The method of claim 6, wherein said advance permissions define a number of times an authorized user may save modified protected content.

8. The method of claim 7, wherein said advance permissions define whether modified protected content may be saved within a new PDP or an existing PDP.

9. The method of claim 1, wherein said advance permissions define whether an authorized user may save all or a portion of protected content.

10. The method of claim 1, wherein said advance permissions define whether a user may perform one or more of the following: view protected content, print protected content and modify protected content.

11. The method of claim 1, wherein said advance permissions define whether a user may share protected content with another user.

12. The method of claim 1, wherein said advance permissions define whether a user may share protected content with an unauthorized user.

13. The method of claim 1, wherein said advance permissions are indicated via any of an advanced permissions byte, word, data element or message within a CCL.

14. The method of claim 1, wherein advanced permission available to an authorized user having an appropriate CCL are defined within a PDP.

15. The method of claim 1, further comprising:
enabling an authorized user communicating via a secure tunnel or virtual private network to modify PDP content via an editing mode associated with said LCV.

16. The method of claim 6, further comprising receiving PDP document updates and propagating an updated PDP document to one or more other authorized users.

17. An apparatus for securely distributing content, comprising:
a processor configured for:
generating a protected document package (PDP) including encrypted content or a link to encrypted content, a Publisher Key (PK) for decrypting said encrypted content for presentation of said content by an authorized user via a Limited Capability Viewer (LCV), and software instructions which, when executed by a processor at a user device of a proposed authorized user, cause said user device to generate a Content Consumer License Request (CCLR) identifying said PK, said authorized user comprising a user having a Content Consumer License (CCL) compatible with the PK to enable thereby said decryption of said encrypted content by said PK included within said PDP and use of decrypted content in accordance with advanced permissions indicated via said CCL;
propagating, via a network, the PDP toward at least one user; and
in response to receiving from a proposed authorized user a CCLR identifying said PK, propagating a CCL compatible with the PK toward said proposed authorized user.

18. A non-transitory computer readable medium including software instructions which, when executed by a processor, perform a method for securely distributing content, comprising:
generating, at a server in communication with a network, a protected document package (PDP) including encrypted content or a link to encrypted content, a Publisher Key (PK) for decrypting said encrypted content for presentation of said content by an authorized user via a Limited Capability Viewer (LCV), and software instructions which, when executed by a processor at a user device of a proposed authorized user, cause said user device to generate a Content Consumer License Request (CCLR) identifying said PK, said authorized user comprising a user having a Content Consumer License (CCL) compatible with the PK to enable thereby said decryption of said encrypted content by said PK included within said PDP and use of decrypted content in accordance with advanced permissions indicated via said CCL;
propagating, via said network, the PDP toward at least one user; and
in response to receiving from a proposed authorized user a CCLR identifying said PK, propagating a CCL compatible with the PK toward said proposed authorized user;
said method further comprising enabling an authorized user communicating via a secure tunnel or virtual private network to modify PDP content via an editing mode associated with said LCV.

19. A method for securely receiving content at a user device including a memory and a processor, said processor configured for:
receiving, at said user device, a protected document package (PDP) including encrypted content or a link to encrypted content, a Publisher Key (PK) for decrypting said encrypted content for presentation of said content by an authorized user via a Limited Capability Viewer (LCV), and software instructions which, when executed by a processor at a user device of a proposed authorized user, cause said user device to generate a Content Consumer License Request (CCLR) identifying said PK, said authorized user comprising a user having a Content Consumer License (CCL) compatible with the PK to enable thereby said decryption of said encrypted content by said PK included within said PDP and use of decrypted content in accordance with advanced permissions indicated via said CCL;
in response to a determination that a CCL compatible with the PK included within the PDP is available at the user device, storing, in user device memory, encrypted content included within said PDP or retrieved via a link included within said PDP and presenting, via a user device LCV, the stored encrypted content;
in response to a determination that a CCL compatible with the PK included within the PDP is not available at the user device, transmitting a Content Consumer License Request (CCLR).

* * * * *

US010095848C1

(12) EX PARTE REEXAMINATION CERTIFICATE (12035th)
United States Patent
Phadke et al.

(10) Number: US 10,095,848 C1
(45) Certificate Issued: *Apr. 11, 2022

(54) SYSTEM, METHOD AND APPARATUS FOR SECURELY DISTRIBUTING CONTENT

(71) Applicant: paSafeShare LLC, Colts Neck, NJ (US)

(72) Inventors: Madhav S Phadke, Colts Neck, NJ (US); Kedar M Phadke, Colts Neck, NJ (US)

(73) Assignee: PASAFESHARE LLC, Colts Neck, NJ (US)

Reexamination Request:
No. 90/014,741, Apr. 27, 2021

Reexamination Certificate for:
Patent No.: 10,095,848
Issued: Oct. 9, 2018
Appl. No.: 15/276,265
Filed: Sep. 26, 2016

(*) Notice: This patent is subject to a terminal disclaimer.

Related U.S. Application Data

(63) Continuation-in-part of application No. 14/029,021, filed on Sep. 17, 2013, now Pat. No. 9,455,961, which is a continuation-in-part of application No. 13/162,209, filed on Jun. 16, 2011, now Pat. No. 9,615,116.

(60) Provisional application No. 61/702,292, filed on Sep. 18, 2012.

(51) Int. Cl.
| | |
|---|---|
| G06F 21/16 | (2013.01) |
| H04L 29/06 | (2006.01) |
| H04N 21/254 | (2011.01) |
| H04N 21/4627 | (2011.01) |
| G06F 21/62 | (2013.01) |
| G06F 21/31 | (2013.01) |

(52) U.S. Cl.
CPC .......... *G06F 21/16* (2013.01); *G06F 21/6245* (2013.01); *H04L 63/0428* (2013.01); *H04N 21/2541* (2013.01); *H04N 21/4627* (2013.01); *G06F 21/31* (2013.01); *H04L 2463/041* (2013.01)

(58) Field of Classification Search
None
See application file for complete search history.

(56) References Cited

To view the complete listing of prior art documents cited during the proceeding for Reexamination Control Number 90/014,741, please refer to the USPTO's public Patent Application Information Retrieval (PAIR) system under the Display References tab.

*Primary Examiner* — Adam L Basehoar

(57) ABSTRACT

System, method and apparatus for securely distributing content via an encrypted file wherein a Publisher Key (PK) associated with an authorized publisher enables presentation of the content by the authorized user via a Limited Capability Viewer (LCV), the LCV lacking the capability to forward, print, copy or otherwise disseminate the content to be presented unless available advanced permissions are granted to the authorized user.

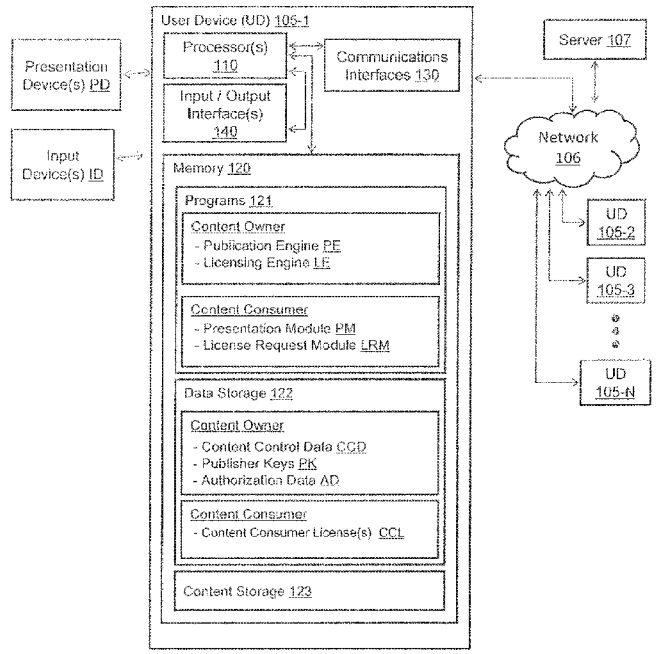

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1, 3-4, 6, 9-11, 13-15 and 17-19 is confirmed.

Claims 2, 5, 7-8, 12 and 16 were not reexamined.

\* \* \* \* \*